(12) United States Patent
Nishio et al.

(10) Patent No.: US 9,684,229 B2
(45) Date of Patent: Jun. 20, 2017

(54) CAMERA ACCESSORY AND CAMERA

(71) Applicant: CANON KABUSHIKI KAISHA, Tokyo (JP)

(72) Inventors: Tetsuya Nishio, Kawasaki (JP); Yoshihiko Konno, Tachikawa (JP); Tatsuyuki Tokunaga, Saitama (JP); Takashi Hasegawa, Tokyo (JP); Azusa Sugawara, Yokohama (JP); Hiroshi Kikuchi, Zushi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 13/856,459

(22) Filed: Apr. 4, 2013

(65) Prior Publication Data
US 2013/0287388 A1    Oct. 31, 2013

(30) Foreign Application Priority Data

Apr. 4, 2012   (JP) ................................ 2012-085190
Apr. 4, 2012   (JP) ................................ 2012-085223

(Continued)

(51) Int. Cl.
G03B 17/00    (2006.01)
G03B 17/56    (2006.01)
G03B 17/14    (2006.01)

(52) U.S. Cl.
CPC .......... *G03B 17/566* (2013.01); *G03B 17/14* (2013.01); *G03B 17/565* (2013.01)

(58) Field of Classification Search
CPC .............................. G03B 17/56; G03B 17/00

(Continued)

(56) References Cited

U.S. PATENT DOCUMENTS 4,448,509 A    5/1984   Katsuma et al.
4,464,034 A    8/1984   Tomino
(Continued)

FOREIGN PATENT DOCUMENTS

CN    1761910 A    4/2006
CN    1806204 A    7/2006
(Continued)

OTHER PUBLICATIONS

Japanese Office Action issued in corresponding application No. 2013-049118 on Oct. 1, 2013.
(Continued)

*Primary Examiner* — Clayton E Laballe
*Assistant Examiner* — Fang-Chi Chang
(74) *Attorney, Agent, or Firm* — Carter, DeLuca, Farrell & Schmidt, LLP

(57) ABSTRACT

The camera accessory is attachable to a camera. The camera accessory includes an accessory mount to be detachably coupled with a camera mount). The accessory mount is provided with accessory bayonet claws and brought, by relative rotation with the camera mount, from a first state in which each of the accessory bayonet claws is inserted between camera bayonet claws provided in the camera mount into a second state in which the accessory bayonet claws engage with the camera bayonet claws to complete coupling of the accessory and camera mounts. The camera accessory is further provided with accessory contact surfaces arranged in a relative rotation direction of the mounts in the accessory mount. The accessory contact surfaces includes a first accessory contact surface used for indicating type of the camera accessory and is provided adjacent to the accessory bayonet claw.

39 Claims, 19 Drawing Sheets

(30) Foreign Application Priority Data

Apr. 4, 2012 (JP) .................................. 2012-085426
Jul. 5, 2012 (JP) .................................. 2012-150961

(58) Field of Classification Search
USPC ........................................................ 396/532
See application file for complete search history.

(56) References Cited

U.S. PATENT DOCUMENTS

| | | | |
|---|---|---|---|
| 4,737,812 | A | 4/1988 | Hasegawa et al. |
| 4,739,356 | A | 4/1988 | Ogura et al. |
| 4,841,322 | A | 6/1989 | Kawasaki et al. |
| 4,853,725 | A | 8/1989 | Matsuda et al. |
| 4,860,043 | A | 8/1989 | Kurei et al. |
| 4,999,659 | A | 3/1991 | Fukahori et al. |
| 5,030,982 | A | 7/1991 | Takebayashi |
| 5,177,520 | A * | 1/1993 | Kohno et al. ................. 396/129 |
| 5,781,818 | A | 7/1998 | Kobayashi |
| 6,041,189 | A | 3/2000 | Izukawa |
| 6,352,378 | B1 | 3/2002 | Izukawa |
| 6,400,907 | B1 | 6/2002 | Izukawa |
| 2004/0028400 | A1 | 2/2004 | Murakami |
| 2004/0046890 | A1 | 3/2004 | Kikuchi et al. |
| 2004/0052515 | A1 | 3/2004 | Nishida et al. |
| 2004/0202464 | A1* | 10/2004 | Miyasaka et al. ............ 396/529 |
| 2004/0252991 | A1 | 12/2004 | Kawai et al. |
| 2005/0268000 | A1* | 12/2005 | Carlson .......................... 710/15 |
| 2007/0077063 | A1 | 4/2007 | Tokiwa et al. |
| 2007/0126871 | A1 | 6/2007 | Henninger et al. |
| 2008/0304818 | A1 | 12/2008 | Kranz et al. |
| 2009/0269049 | A1 | 10/2009 | Ueda et al. |
| 2012/0063016 | A1 | 3/2012 | Imafuji et al. |

FOREIGN PATENT DOCUMENTS

| | | |
|---|---|---|
| CN | 1984257 A | 6/2007 |
| CN | 202102220 U | 1/2012 |
| CN | 102385141 A | 3/2012 |
| CN | 203241681 U | 10/2013 |
| CN | 203241682 U | 10/2013 |
| CN | 203241683 U | 10/2013 |
| CN | 203275857 U | 11/2013 |
| EP | 0262679 A2 | 4/1988 |
| EP | 0262679 A3 | 11/1988 |
| EP | 1672420 A1 | 6/2006 |
| GB | 2158957 A | 11/1985 |
| JP | 59-048742 A | 3/1984 |
| JP | 62-032426 A | 2/1987 |
| JP | S62-195633 A | 8/1987 |
| JP | 62-220937 A | 9/1987 |
| JP | 01-302238 A | 12/1989 |
| JP | 02-063030 A | 3/1990 |
| JP | 02-163728 A | 6/1990 |
| JP | 02-222934 A | 9/1990 |
| JP | H07-043773 A | 2/1995 |
| JP | 07-114087 A | 5/1995 |
| JP | 09-090488 A | 4/1997 |
| JP | H09-211645 A | 8/1997 |
| JP | 11-223865 A | 8/1999 |
| JP | 11-346435 A | 12/1999 |
| JP | 2000-047308 A | 2/2000 |
| JP | 2001-034327 A | 2/2001 |
| JP | 2002-341424 A | 11/2002 |
| JP | 2004-069990 A | 3/2004 |
| JP | 2004-117380 A | 4/2004 |
| JP | 2004-361898 A | 12/2004 |
| JP | 2005-043578 A | 2/2005 |
| JP | 2005-115170 A | 4/2005 |
| JP | 2005-157001 A | 6/2005 |
| JP | 2007-101656 A | 4/2007 |
| JP | 2007-171506 A | 7/2007 |
| JP | 2007-241054 A | 9/2007 |
| JP | 2009-93122 A | 4/2009 |
| JP | 2009-288782 A | 12/2009 |
| JP | 2010-117571 A | 5/2010 |
| JP | 2010-152398 A | 7/2010 |
| JP | 2010-282101 A | 12/2010 |
| WO | 2009/048074 A1 | 4/2009 |

OTHER PUBLICATIONS

Office Action issued in corresponding Russian application No. 2013115176 on Oct. 14, 2014.
Japanese Office Action issued in corresponding application No. 2013-052907 on Jan. 20, 2015.
Japanese Office Action issued in corresponding application No. 2012-150961 on Oct. 6, 2015.
European Search Report (Partial) issued in corresponding application No. 13162290.4 dated Dec. 9, 2013.
U.S. Notice of Allowance issued in corresponding U.S. Appl. No. 13/856,581, dated Jan. 8, 2015.
European Search Report issued in corresponding application No. 13162290.4 dated Feb. 2, 2015.
U.S. Notice of Allowance issued in corresponding U.S. Appl. No. 14/683,939 dated May 26, 2015.
Chinese Office Action issued in corresponding application No. 201310120138.0 dated Jun. 30, 2015.
Japanese Office Action issued in corresponding application No. 2012-150961 dated Jul. 14, 2015.
Chinese Office Action issued in corresponding application No. 201310119448.0 dated Jul. 30, 2015.
U.S. Office Action issued in corresponding U.S. Appl. No. 14/822,148 dated Sep. 15, 2015.
U.S. Office Action issued in corresponding U.S. Appl. No. 13/856,555 on Dec. 10, 2015.
European Partial Search Report issued in corresponding application No. EP 13772154.4 on Nov. 18, 2015.
Chinese Office Action issued in corresponding application No. 201380017423.8 on Jun. 29, 2016.
U.S. office action issued in related U.S. Appl. No. 14/389,865, dated Jul. 28, 2016.
Office Action issued in corresponding Japanese Application No. 2014-033805 on Jan. 31, 2017.

* cited by examiner

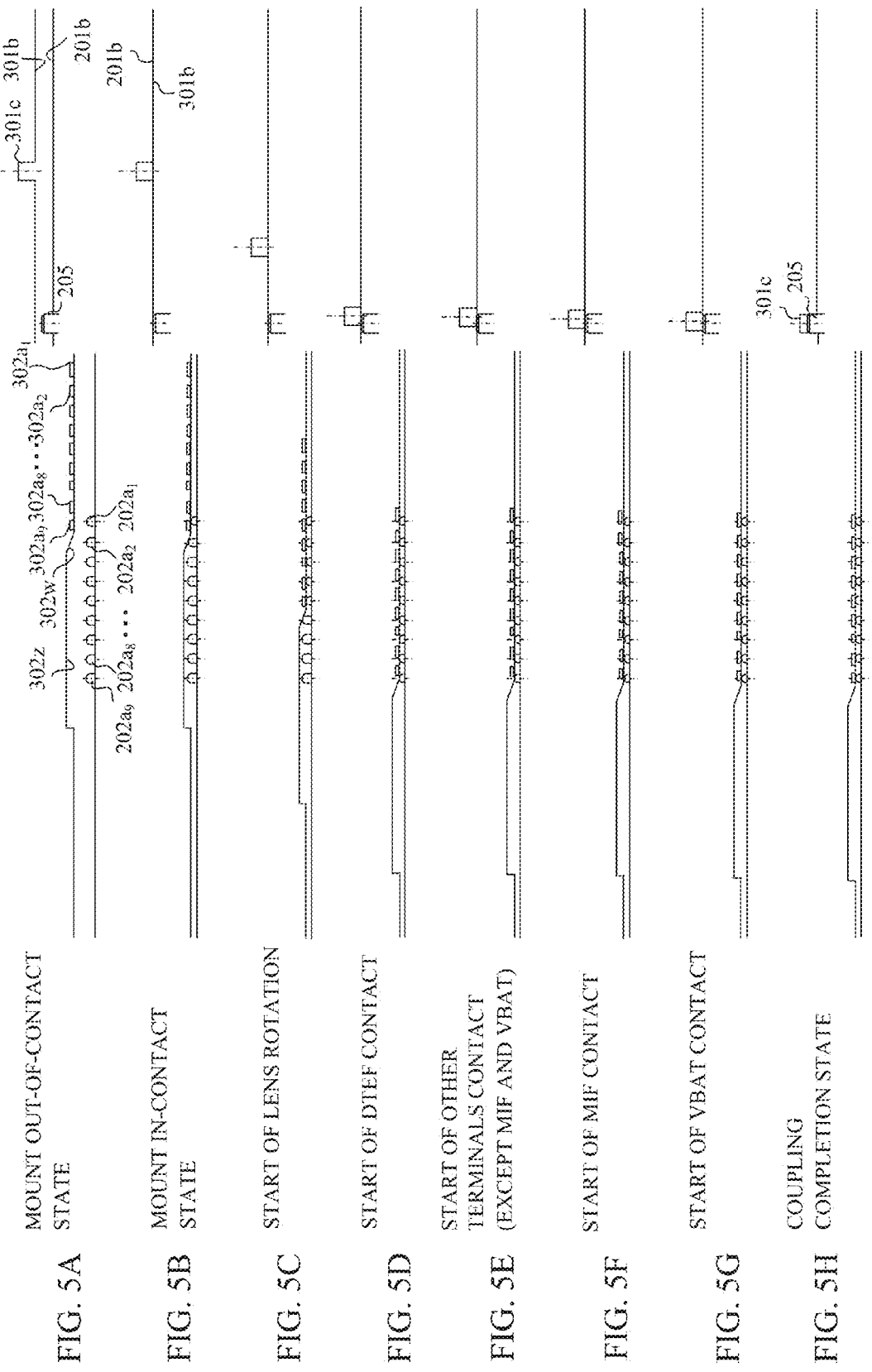

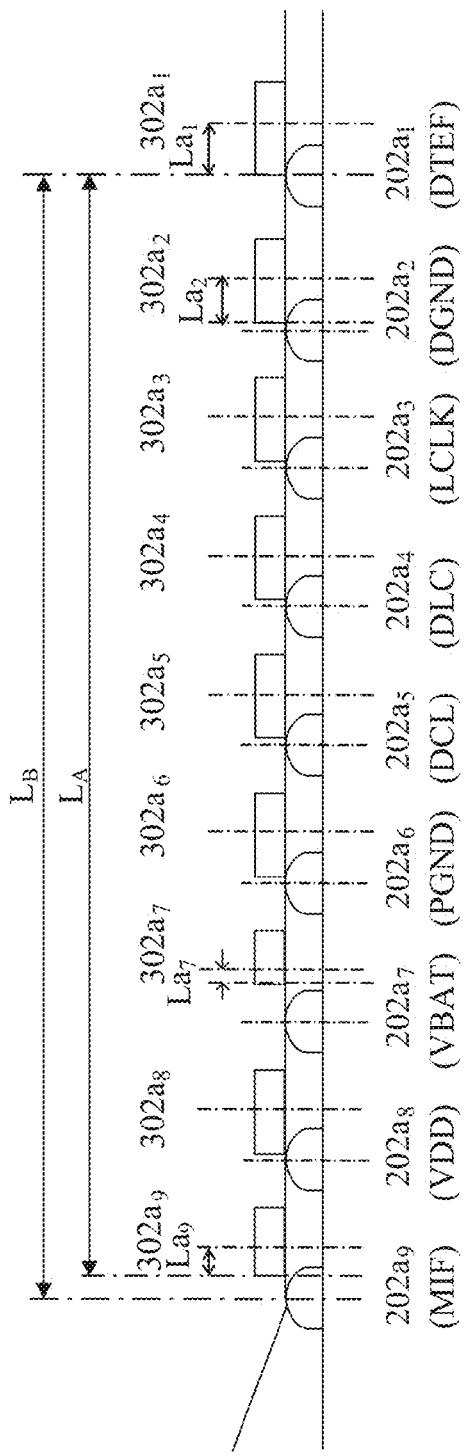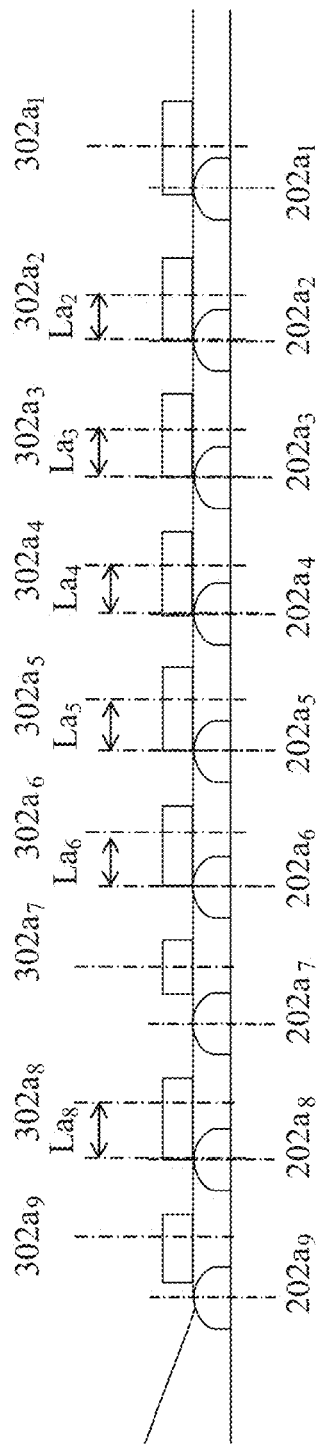
FIG. 6A
FIG. 6B

CAMERA ACCESSORY AND CAMERA

BACKGROUND OF THE INVENTION

Field of the Invention

The present invention relates to a camera and a camera accessory interchangeably attachable to the camera such as an interchangeable lens.

Description of the Related Art

Such camera accessories (each hereinafter simply referred to as "an accessory") receive, in a state of being attached to a camera, supply of power from the camera and perform communication of commands, data or the like with the camera. In order to perform such supply of power and communication, an attachment portion (mount) of the camera and that of the accessory are provided with multiple electrical contacts (each hereinafter simply referred to as "a contact") in which paired ones are brought into contact with each other to establish electrical connection. Moreover, as a method of the attachment (coupling) of the camera and the accessory, bayonet coupling is often used in which the mounts of the camera and accessory are relatively rotated to cause bayonet claws provided in the respective mounts to engage with each other.

In some of such cameras and accessories, a signal to be used by the camera for determination of type of the accessory attached thereto is input from the accessory to the camera, via a specific contact (hereinafter referred to as "an accessory type determining contact") among the multiple contacts provided in each mount of the accessory and camera. The camera receiving the signal switches, according to the determined accessory type, for example, a voltage or a method to be used for communication between the camera and the accessory.

In each of a camera and an interchangeable lens disclosed in Japanese Patent Laid-Open No. 09-211645, an engaging claw provided in its bayonet mount and a power supplying contact provided inside the bayonet mount to supply power from the camera to the interchangeable lens are arranged so as to overlap each other in a radial direction of the bayonet mount. This arrangement prevents a portion around the power supplying contact in the interchangeable lens from being displaced due to external force acting on the interchangeable lens, and thereby avoids that the supply of power from the camera to the interchangeable lens is stopped due to connection failure between the power supplying contacts.

However, the bayonet mounts of the camera and interchangeable lens disclosed in Japanese Patent Laid-Open No. 09-211645 are not provided with the accessory type determining contacts.

Moreover, the connection failure between the accessory type determining contacts causes the camera to make an erroneous determination of the type of the accessory, which results in setting of an improper communication voltage by the camera for the attached interchangeable lens and thereby may cause an erroneous operation of the accessory.

SUMMARY OF THE INVENTION

The present invention provides a camera accessory and a camera, which are capable of preventing connection failure of accessory type determining contacts provided in their mounts.

The present invention provides as one aspect thereof a camera accessory detachably attachable to a camera. The camera accessory includes an accessory mount to be detachably coupled with a camera mount provided in the camera, the accessory mount being provided with accessory bayonet claws and being brought, by relative rotation with the camera mount, from a first state in which each of the accessory bayonet claws is inserted between camera bayonet claws provided in the camera mount into a second state in which the accessory bayonet claws engage with the camera bayonet claws to complete coupling of the accessory and camera mounts, and a plurality of accessory contact surfaces arranged in a relative rotation direction of the accessory and camera mounts in the accessory mount. The accessory contact surfaces includes a first accessory contact surface used for indicating type of the camera accessory. The first accessory contact surface is provided adjacent to the accessory bayonet claw.

The present invention provides as another aspect thereof a camera to which a camera accessory is detachably attachable. The camera includes a camera mount to be detachably coupled with an accessory mount provided in the camera accessory, the camera mount being provided with camera bayonet claws and being brought, by relative rotation with the accessory mount, from a first state in which each of accessory bayonet claws provided in the accessory mount is inserted between the camera bayonet claws into a second state in which the camera bayonet claws engage with the accessory bayonet claws to complete coupling of the camera and accessory mounts, a camera contact holding portion provided in the camera mount, and a plurality of camera contact pins arranged in a relative rotation direction of the accessory and camera mounts and held by the camera side contact holding portion. The camera contact holding portion holds the camera contact pins movably in a direction of protruding and retracting with respect to the camera contact holding portion. The camera contact pins includes a first camera contact pin used for determination of type of the camera accessory attached to the camera. The first camera contact pin is provided adjacent to the camera bayonet claw.

The present invention provides as still another aspect thereof a camera accessory detachably attachable to a camera. The camera accessory includes an accessory mount to be detachably coupled with a camera, the accessory mount including accessory bayonet claws, and a plurality of accessory contact surfaces provided in the accessory mount. The accessory contact surfaces includes a first accessory contact surface used for indicating type of the camera accessory. The first accessory contact surface is provided adjacent to the accessory bayonet claw.

Other aspects of the present invention will become apparent from the following description and the attached drawings.

BRIEF DESCRIPTION OF THE DRAWINGS

FIGS. 5A to 5H show relationships of the connectors during a lens attachment process in Embodiment 1.

FIGS. 6A to 6E are enlarged views of FIGS. 5D to 5H.

DETAILED DESCRIPTION OF THE EMBODIMENTS

Exemplary embodiments of the present invention will hereinafter be described with reference to the accompanying drawings.

[Embodiment 1 ]

Figure 1A:
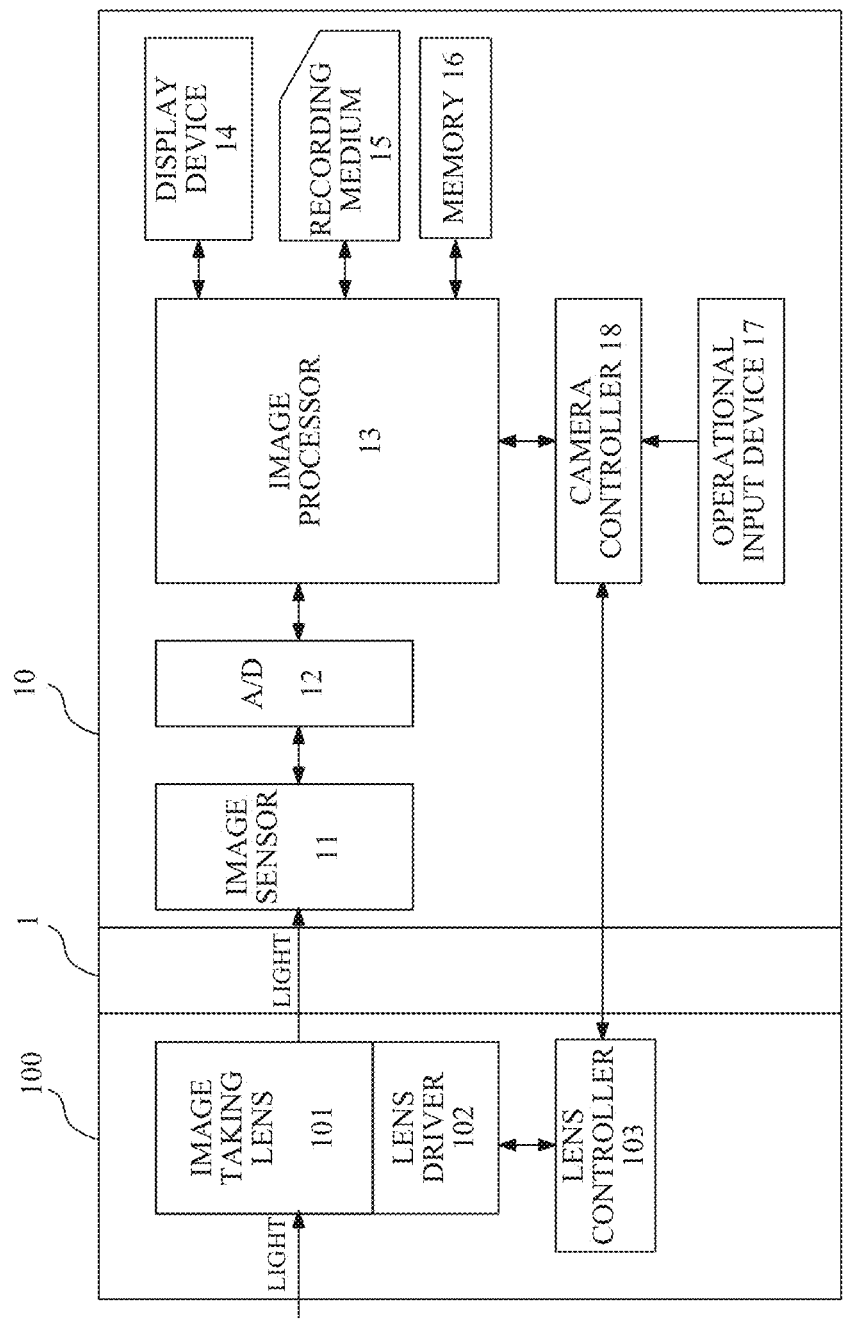
FIGS. 1A and 1B are block diagrams showing an electrical configuration of a camera and an interchangeable lens attached thereto, which are Embodiment 1 of the present invention.

FIG. 1A shows an interchangeable lens 100 as a camera accessory and a camera 10 to which the interchangeable lens 100 is detachably (that is, interchangeably) attached, which are Embodiment 1 of the present invention and constitute a camera system. The camera 10 and the interchangeable lens 100 each have a mount 1 provided with electrical contacts for supplying source power from the camera 10 to the interchangeable lens 100 and for performing communication therebetween. Although this embodiment describes the interchangeable lens as the camera accessory detachably attachable to the camera, other camera accessories are also included in other embodiments of the present invention.

The camera 10 includes an image sensor (image pickup element) 11 that photoelectrically converts an object image as an optical image formed by an image taking lens 101 housed in the interchangeable lens 100 and outputs an analog electrical signal. Moreover, the camera 10 includes an A/D converter 12 that converts the analog electrical signal output from the image sensor 11 into a digital signal and an image processor 13 that performs various image processes on the digital signal to produce an image signal. The image signal (still image or video) produced by the image processor 13 is displayed on a display device 14 or recorded in a recording medium 15.

The camera 10 further includes a memory 16 that serves as a buffer for performing the process on the image signal and stores operation programs to be used by a camera controller 18 described later. The camera 10 is additionally provided with an operational input device 17 that includes a power switch for switching power on and off, an image capturing switch for starting recording of the image signal and a selection/setting switch for performing setting in various menus. The camera controller 18 including a microcomputer controls the image processor 13 according to signals from the operational input device 17 and controls communication with the interchangeable lens 100.

On the other hand, the interchangeable lens 100 includes a lens driver 102 that drives actuators to move a focus lens, a zoom lens, an aperture stop and an image stabilizing lens included (but not shown) in the image taking lens 101. The interchangeable lens 100 is further provided with a lens controller 103 that includes a microcomputer and controls the lens driver 102 according to control signals from the camera controller 18 through the communication.

Figure 1B:
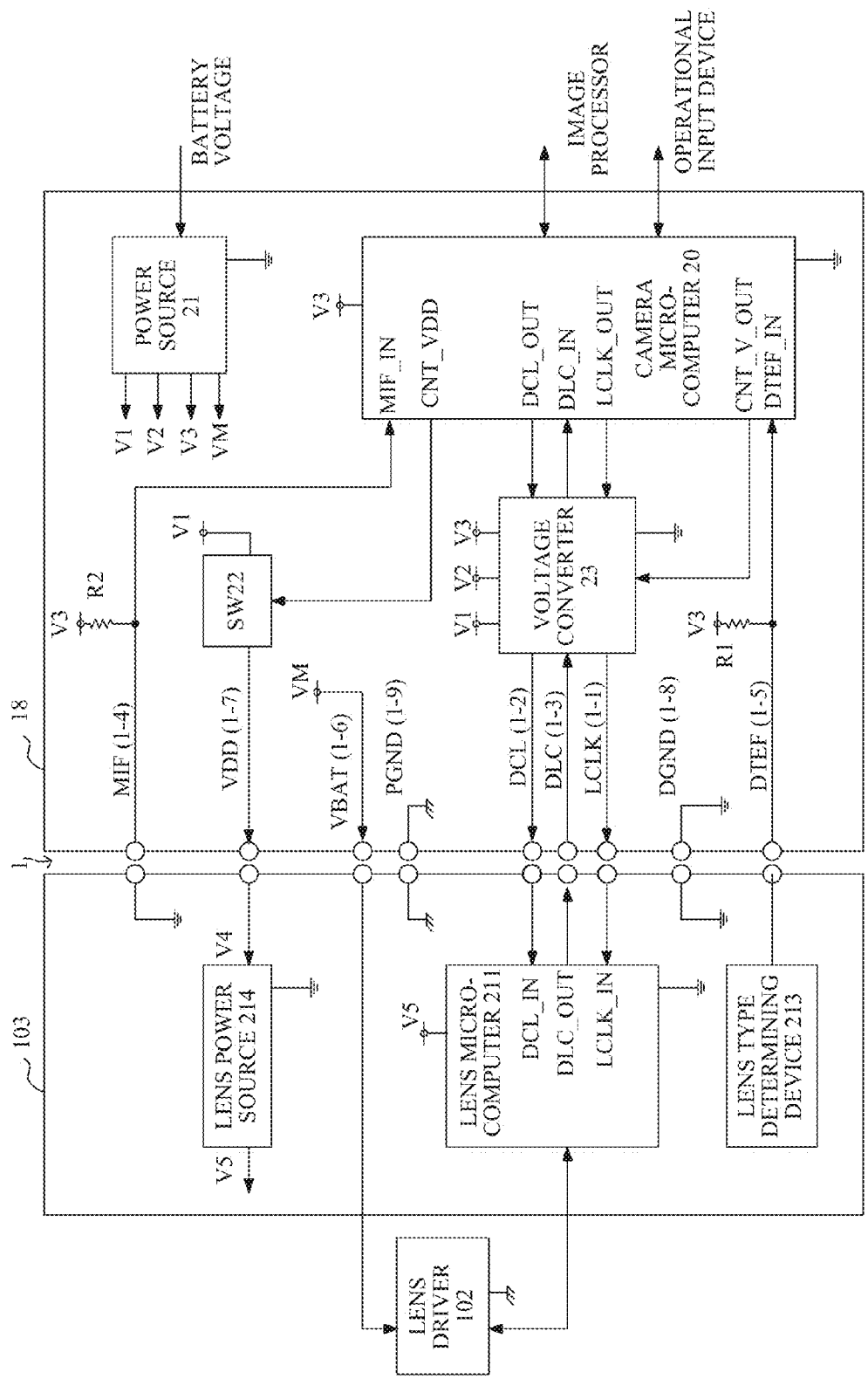

FIG. 1B shows terminals provided in the mount for electrical connection of the camera 10 (camera controller 18) and the interchangeable lens 100 (lens controller 103).

An LCLK terminal (1-1) is a terminal for a communication clock signal output from the camera 10 to the interchangeable lens 100. A DCL terminal (1-2) is a terminal for communication data output from the camera 10 to the interchangeable lens 100. A DLC terminal (1-3) is a terminal for communication data output from the interchangeable lens 100 to the camera 10.

An MIF terminal (1-4) is a terminal for detecting attachment of the interchangeable lens 100 to the camera 10. The microcomputer (hereinafter referred to as "a camera microcomputer") 20 in the camera controller 18 detects that the interchangeable lens 100 is attached to the camera 10 on a basis of a voltage of the MIF terminal.

A DTEF terminal (1-5) is a terminal for detecting type of the interchangeable lens 100 attached to the camera 10. The camera microcomputer 20 detects (determines) the type of the interchangeable lens 100 attached to the camera 10 on a basis of a voltage of the DTEF terminal. The voltage of the DTEF terminal corresponds to a signal to be used by the camera 10 to determine (or identify) the type of the camera accessory (interchangeable lens 100) attached to the camera 10.

A VBAT terminal (1-6) is a terminal for supplying driving source power (VM) from the camera 10 to the interchangeable lens 100; the driving source power is used for various operations of the interchangeable lens 100 such as drive of various actuators, except communication control. A VDD terminal (1-7) is a terminal for supplying communication controlling source power (VDD) from the camera 10 to the interchangeable lens 100; the communication controlling source power is used for communication control in the interchangeable lens 100. The VBAT terminal is provided separately from the VDD terminal. This is because sharing of a same terminal by the VBAT terminal and the VDD terminal may increase electrical current flowing through the terminal due to a heavy load caused by drive of the actuator or the like, which may affect operation of the microcomputer. Moreover, the communication control source power is necessary to be always supplied from the camera 10 to the interchangeable lens 100 through the VDD terminal, and on the other hand the driving source power may be supplied from the camera 10 to the interchangeable lens 100 through the VBAT terminal as needed.

A DGND terminal (1-8) is a terminal for connecting a communication control system of the camera 10 and interchangeable lens 100 to ground. That is, the DGND terminal is provided as a grounding terminal along with the VDD terminal. A PGND terminal (1-9) is a terminal for connecting a mechanical drive system including the actuator such as a motor, which is provided in each of the camera 10 and the interchangeable lens 100, to the ground. In other words, the PGND terminal is provided as a grounding terminal along with the VBAT terminal.

Description will hereinafter be made of a case where the camera 10 identifies, as the interchangeable lenses 100 of different types, a first interchangeable lens and a second interchangeable lens whose communication voltages are different from each other. The communication voltage will be described later.

A camera power supply 21 provided in the camera controller 18 converts a battery voltage supplied from a battery (not shown) included in the camera 10 into voltages necessary for operations of respective circuits in the camera 10. Specifically, the camera power supply 21 produces voltages V1, V2, V3 and VM.

The voltage V1 is a voltage as the communication controlling source power (VDD) of the first and second interchangeable lenses, and the communication voltage of the first interchangeable lens. The voltage V2 is the communication voltage of the second interchangeable lens. The voltage V3 is a voltage as an operating source power of the camera microcomputer 20. The voltage VM is, as mentioned above, a voltage as the driving source power of the actuators provided in the first and second interchangeable lenses. The voltage V1 is different from the voltage V2. On the other hand, the voltage V1 may be same as the voltage V3 or VM, and the voltage V2 may be same as the voltage V3 or VM (or may be different from both the voltages V3 and VM).

In response to turn-on of the power switch 22, the camera microcomputer 20 starts supply of the VDD and VM from the camera 10 to the interchangeable lens 100. In response to turn-off of the power switch 22, the camera microcomputer 20 ends the supply of the VDD and VM from the camera 10 to the interchangeable lens 100.

The camera microcomputer 20 performs communication with the interchangeable lens 100 through a voltage converter 23. The camera microcomputer 20 has an LCLK_OUT terminal for outputting a communication clock signal, a DCL_OUT terminal for sending communication data to the interchangeable lens 100 and a DLC_IN terminal for receiving communication data from the interchangeable lens 100. Moreover, the camera microcomputer 20 has an MIF_IN terminal for detecting the attachment of the interchangeable lens 100 to the camera 10, a DTEF_IN terminal for identifying the type of the attached interchangeable lens 100, and a CNT_V_OUT terminal for outputting a communication voltage switching signal to the voltage converter 23. The camera microcomputer 20 further has a CNT_VDD_OUT terminal for outputting a current-applying signal to the power switch 22, a connection terminal connected with the image processor 13 and another connection terminal connected with the operational input device 17. Operation of the voltage converter 23 will be described later.

A lens power supply 214 converts the VDD (V4) supplied from the camera 10 to the interchangeable lens 100 into a voltage V5. A microcomputer (hereinafter referred to as "a lens microcomputer") 211 in the lens controller 103 performs communication with the camera microcomputer 20 through the voltage converter 23. The lens microcomputer 211 has an LCLK_IN terminal for receiving the communication clock signal, a DLC_OUT terminal for sending the communication data to the camera 10, a DCL_IN terminal for receiving the communication data from the camera 10 and a connection terminal connected with the lens driver 102.

Description will be made of the detection of the attachment of the interchangeable lens (first and second interchangeable lenses) 100 to the camera 10. The MIF_IN terminal of the camera microcomputer 20 is pulled up to the source voltage by a resistance R2 (for example, 100 KΩ) provided in the camera controller 18 and thereby becomes H (High) when the interchangeable lens 100 is not attached to the camera 10. On the other hand, the MIF_IN terminal is connected with the ground (GND) in the interchangeable lens (first and second interchangeable lenses) 100 when the interchangeable lens 100 is attached to the camera 10, and thereby becomes L (low) at a point of time when the attachment of the interchangeable lens 100 is made, irrespective of the type of the attached interchangeable lens 100.

Figure 13A:
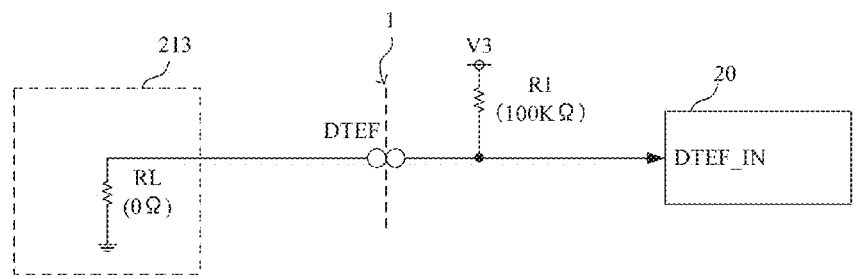
FIGS. 13A and 13B are block diagrams showing connection of lens type determining devices provided in first and second interchangeable lenses with a camera microcomputer in Embodiment 1.
Figure 13B:
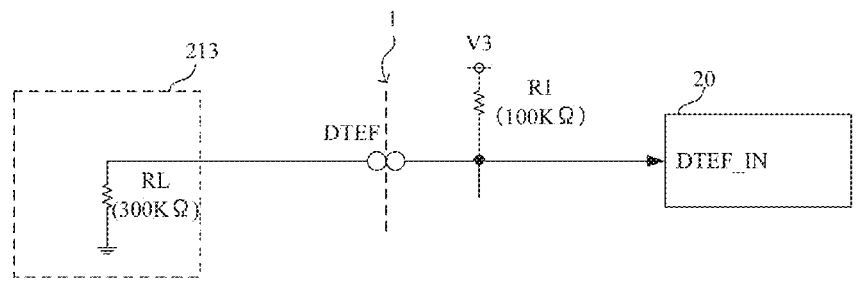

Description will be made of an exemplary configuration of the lens type determining device 213 provided in the lens controller 103 with reference to FIGS. 13A and 13B. The lens type determining device 213 is constituted by a resistance RL provided between the DTEF terminal in the mount 1 and the GND. A resistance value of the resistance RL is preset to a value assigned to the type of the interchangeable lens. For example, the resistance value of the resistance RL provided in the first interchangeable lens shown in FIG. 13A is set to 0Ω, and that of the resistance RL provided in the second interchangeable lens shown in FIG. 13B is set to 300 KΩ.

In the camera 10, a resistance R1 (for example, 100 KΩ) is connected between the DTEF terminal in the mount 1 and the voltage (V3) of the operating source power for the camera microcomputer 20, and the DTEF terminal is connected with the DTEF_IN terminal of the camera microcomputer 20. The DTEF_IN terminal of the camera microcomputer 20 is provided with an AD conversion function (10 Bit AD conversion function in this embodiment).

Description will be made of a lens type determination operation (hereinafter also referred to as "lens type determination") of the camera microcomputer 20 for determining the type of the interchangeable lens 100 attached to the camera 10. The camera microcomputer 20 performs the lens type determination on the basis of the voltage value input to the DTEF_IN terminal. Specifically, the camera microcomputer 20 performs AD conversion of the input voltage value and performs the lens type determination by comparing the AD converted value with lens type determination references stored in the camera microcomputer 20.

For example, when the first interchangeable lens is attached to the camera 10, the AD converted value of the voltage value input to the DTEF_IN terminal is decided, by a resistance ratio RL/(R1+RL) where R1 is 100 KΩ and RL is 0Ω, as approximately "0x0000". The camera microcomputer 20 detects that the AD converted value obtained from the DTEF_IN terminal is within a range of "0x0000 to 0x007F", which is a first lens type determination reference, and thereby determines that the attached interchangeable lens is the first interchangeable lens. On the other hand, when the second interchangeable lens is attached to the camera 10, the AD converted value of the voltage value input to the DTEF_IN terminal is decided, by the resistance ratio RL/(R1+RL) where R1 is 100KΩ and RL is 300 KΩ, as approximately "0x02FF". The camera microcomputer 20 detects that the AD converted value obtained from the DTEF_IN terminal is within a range of "0x0280 to 0x037F", which is a second lens type determination reference, and thereby determines that the attached interchangeable lens is the second interchangeable lens.

Although the above description was made of the case where the resistance value of the resistance RL of the first interchangeable lens is 0Ω, a configuration may be employed which directly connects the DTEF_IN terminal with the GND.

Figure 14:
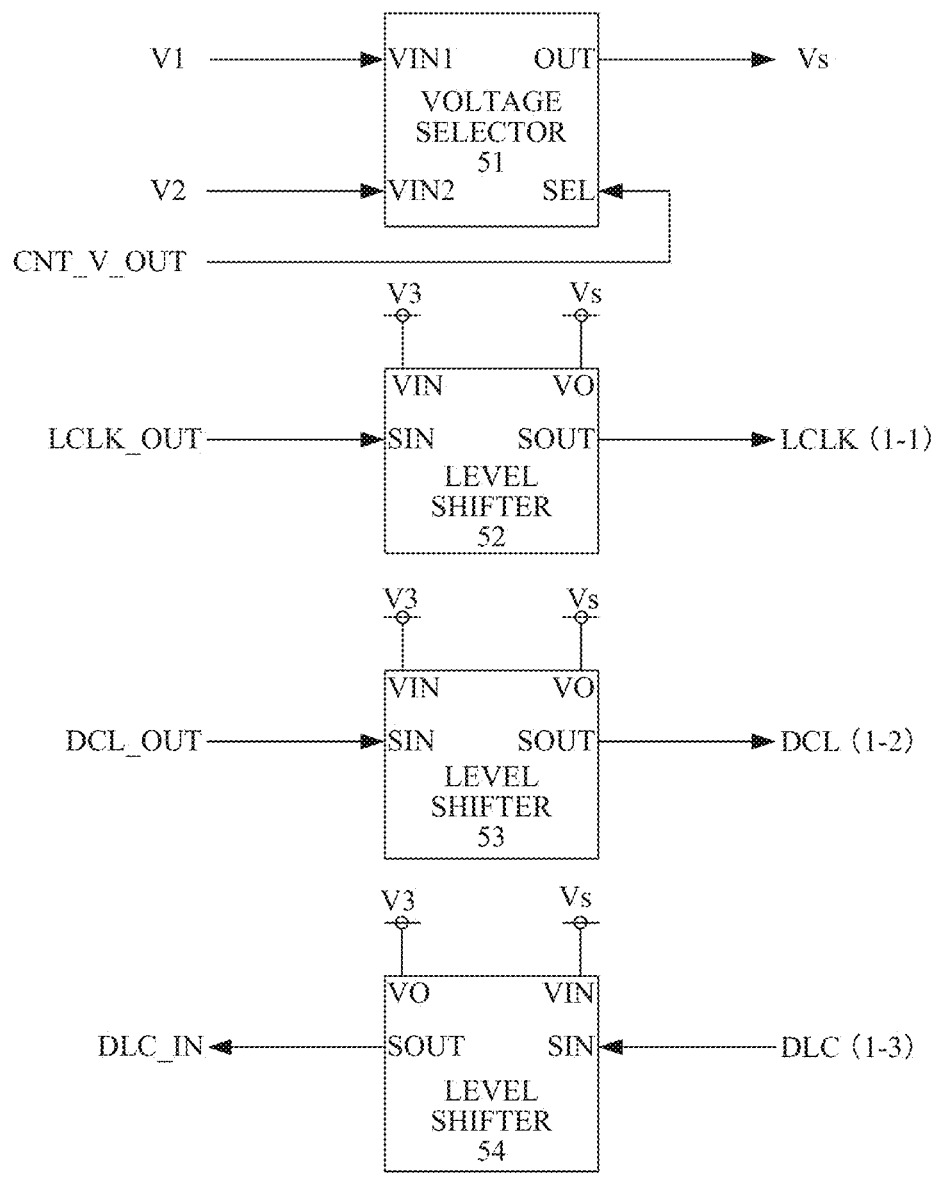
FIG. 14 is a block diagram showing a configuration of a voltage converter in Embodiment 1.

FIG. 14 shows an exemplary configuration of the voltage converter 23. A voltage selector 51 has a function of outputting, to an OUT terminal, any one of two voltages input to a VIN1 terminal and a VIN2 terminal according to a logic signal at an SEL terminal. Specifically, the voltage selector 51 outputs the voltage input to the VIN1 terminal when the input to the SEL terminal is L, and the voltage selector 51 outputs the voltage input to the VIN2 terminal when the input to the SEL terminal is H. The voltage V1 is connected to the VIN1 terminal, the voltage V2 is connected to the VIN2 terminal, and the CNT_V_OUT terminal of the camera microcomputer 20 is connected to the SEL terminal. The output of the OUT terminal is hereinafter referred to as "Vs".

Level shifters 52, 53 and 54 each have a function of converting a voltage of a signal input to an SIN terminal from a voltage at a VIN terminal into a voltage of a VOUT (VO in the figure) terminal and then outputting the converted voltage from an SOUT terminal.

In the level shifter 52, the SIN terminal is connected with the LCLK_OUT terminal of the camera microcomputer 20, and the SOUT terminal is connected with the LCLK terminal of the mount 1. Moreover, the VIN terminal is connected with V3 that is the same voltage as the operating source power voltage of the camera microcomputer 20, and the VOUT terminal is connected with $V_s$ output from the voltage selector 51. In the level shifter 53, the SIN terminal is connected with the DCL_OUT terminal of the camera microcomputer 20, and the SOUT terminal is connected with the DCL terminal of the mount 1. Moreover, the VIN terminal is connected with V3 that is the same voltage as the operating source power voltage of the camera microcomputer 20, and the VOUT terminal is connected with $V_s$ output from the voltage selector 51.

In the level shifter 54, the SIN terminal is connected with the DLC terminal of the mount 1, and the SOUT terminal is connected with the DLC_IN terminal of the camera microcomputer 20. Moreover, the VIN terminal is connected with $V_s$ output from the voltage selector 51, and the VOUT terminal is connected with V3 that is the same voltage as the operating source power voltage of the camera microcomputer 20. Thus, $V_s$ (that is, V1 or V2) output from the voltage selector 51 is used as the communication voltage between the camera 10 and the interchangeable lens 100.

Description will be made of a voltage switching operation of the voltage converter 23. The camera microcomputer 20 controls the CNT_V_OUT terminal according to a logic table shown in Table 1.

from the voltage value of the DTEF_IN terminal that the attached interchangeable lens 100 is the second interchangeable lens, the camera microcomputer 20 outputs L from the CNT_V_OUT terminal to control the communication voltage to V2.

Moreover, when detecting, as the voltage value (AD converted value) of the DTEF_IN terminal, a voltage out of the range of the above-mentioned first and second lens type determination references, the camera microcomputer 20 determines that the attached interchangeable lens is "a non-compliant lens" to which the camera 10 is not compliant or reserves the determination because of being unable to make a normal lens type determination. In these cases, the camera microcomputer 20 does not perform communication with the attached interchangeable lens 100.

Figure 15A:
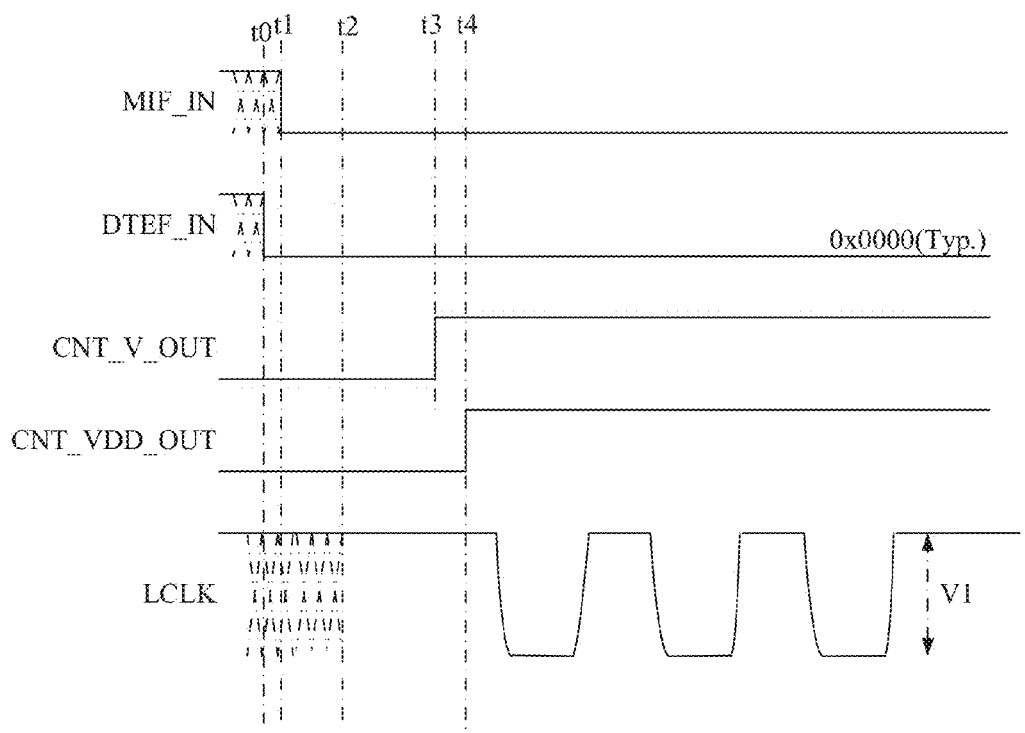
FIGS. 15A and 15B are timing charts showing examples of input and output timings of the camera microcomputer in Embodiment 1.
Figure 15B:
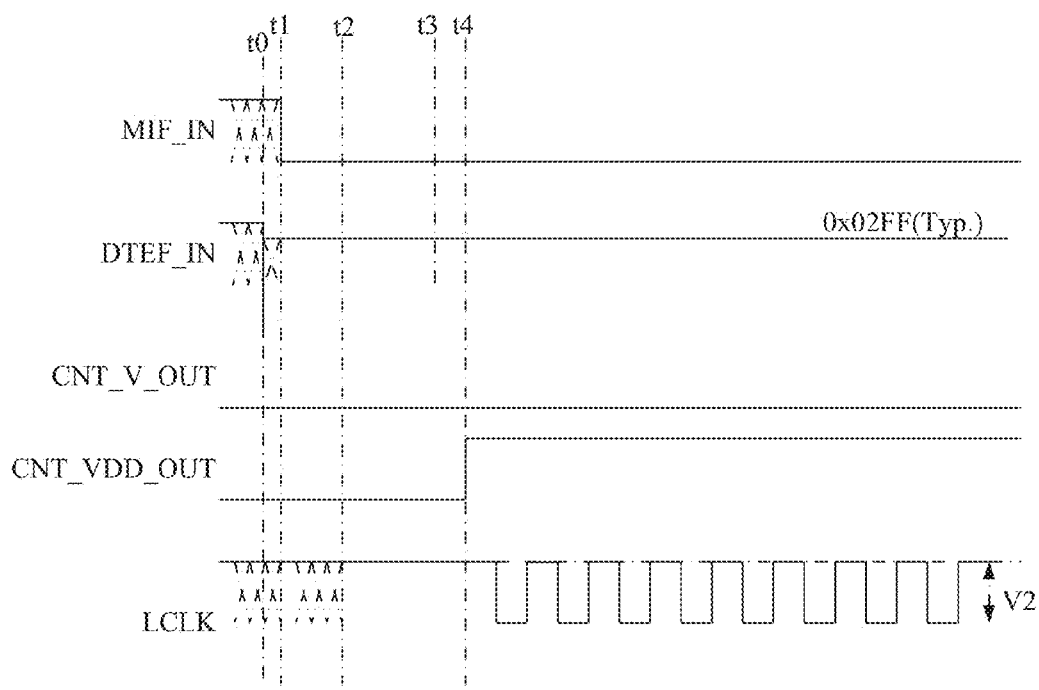

FIGS. 15A and 15B show exemplary input and output timings of the MIF_IN terminal, the DTEF_IN terminal, the CNT_V_OUT terminal, the CNT_VDD_OUT terminal of the camera microcomputer 20 and the LCLK terminal of the mount 1. FIG. 15A shows the input and output timings when the first interchangeable lens is attached to the camera 10, and FIG. 15B shows the input and output timings when the second interchangeable lens is attached to the camera 10. In these figures, t0 represents a time at which voltage input to the DTEF_IN terminal is made during a process of the attachment of the interchangeable lens 100 to the camera 10 (hereinafter referred to as "during a lens attachment process"), and t1 represents a time at which voltage input to the MIF_IN terminal is made during the lens attachment process. Moreover, t2 represents a time at which the camera 10 is activated (power is turned on), t3 represents a time at which the lens type determination and the communication voltage setting are made, and t4 represents a time at which the power supply to the attached interchangeable lens 100 and the communication therewith are started. The time t0 may be identical to the time t1. Although the times at which the voltage input to the DTEF_IN terminal and the voltage input to the MIF_IN terminal are made are respectively, as described above, t0 and t1, the microcomputer 20 reads the voltage value of the DTEF_IN terminal after the MIF_IN terminal becomes L.

In both the cases where the first interchangeable lens is attached to the camera 10 and where the second interchange-

TABLE 1

| | LENS ATTACHED | | | |
|---|---|---|---|---|
| | FIRST INTERCHANGEABLE LENS | SECOND RESERVED | | NON-COMPLIANT LENS |
| DTEF_IN | 0x0000~0x007F | 0x0280~0x037F | 0x0080~0x027F | 0x0380~0x03FF |
| CNT_V_OUT | H | L | — | — |
| COMMUNICATION VOLTAGE | V1 | V2 | NO COMMUNICATION | |

As described above, the camera microcomputer 20 determines the type of the attached interchangeable lens 100 on the basis of the voltage value (AD converted value) input to the DTEF_IN terminal. Then, the camera microcomputer 20 controls a logic signal output from the CNT_V_OUT terminal depending on a result of the lens type determination of the attached interchangeable lens 100. Specifically, when determining from the voltage value of the DTEF_IN terminal that the attached interchangeable lens 100 is the first interchangeable lens, the camera microcomputer 20 outputs H from the CNT_V_OUT terminal to control the communication voltage to V1. On the other hand, when determining able lens is attached thereto, the voltage input to the MIF_IN terminal is made (t1) after (or simultaneously with) the voltage input to the DTEF_IN terminal (t0). Then, after the camera 10 is activated (t2), the lens type determination and the communication voltage setting depending on the result of the lens type determination are performed (t3). Thereafter, the power supply to the interchangeable lens 100 and the communication therewith are started (t4). When the interchangeable lens is attached to the camera 10 after the camera 10 is activated, though t2 is before t0 and t1, the voltage input to the MIF_IN terminal is performed after (or simultaneously with) the voltage input to the DTEF_IN terminal.

When such operation or control for the attachment of the interchangeable lens 100 to the camera 10 (hereinafter referred to as "lens attachment") is performed, irrespective of whether the attached interchangeable lens 100 is the first interchangeable lens or the second interchangeable lens, and irrespective of the camera activation time, it is necessary that the connection of the DTEF terminal in the mount 1 is made before (or simultaneously with) the connection of the MIF terminal. A reason therefor is as follows. As described above, the camera microcomputer 20 reads the voltage value of the DTEF_IN terminal after the MIF_IN terminal becomes L. If the connection of the DTEF terminal is not made even though the MIF_IN terminal became L, the determination that the attached interchangeable lens is the above-mentioned non-compliant lens, and the camera microcomputer 20 does not perform the communication with the interchangeable lens 100. Therefore, in order to determine the type of the attached interchangeable lens 100 and perform the communication using a proper communication voltage with the interchangeable lens 100, it is necessary that the connection of the DTEF terminal is certainly made at the time when the MIF_IN terminal becomes L.

Next, description will be made of a configuration of a camera side connector including camera side contact pins constituting camera side ones of the above-described terminals provided in the mount 1 and a lens side connector including lens side contact patterns (accessory side contact surfaces) constituting lens side ones thereof in the mount 1.

Figure 2A:
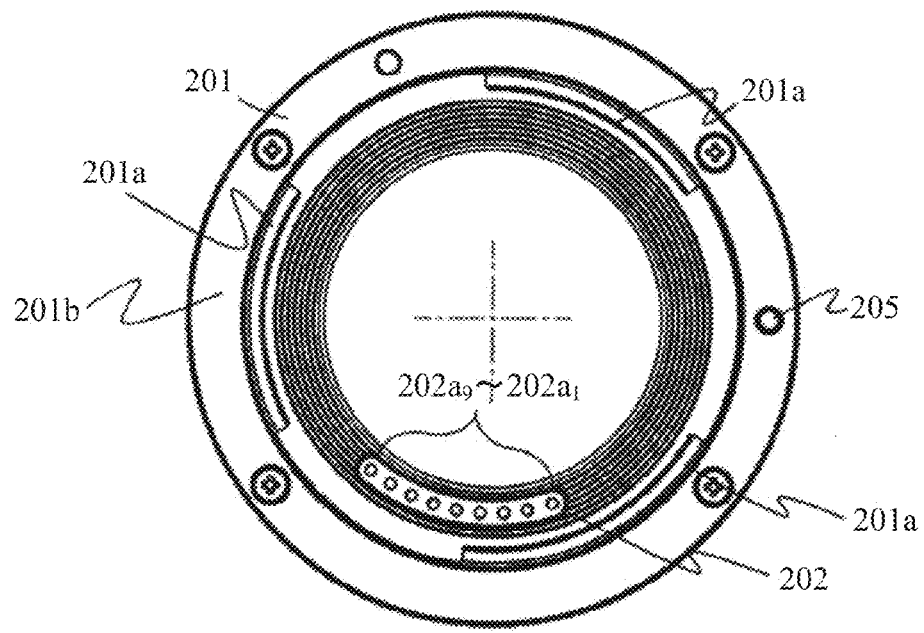
FIGS. 2A and 2B show configurations of mounts and connectors, which are provided in the camera and interchangeable lens of Embodiment 1.
Figure 2B:
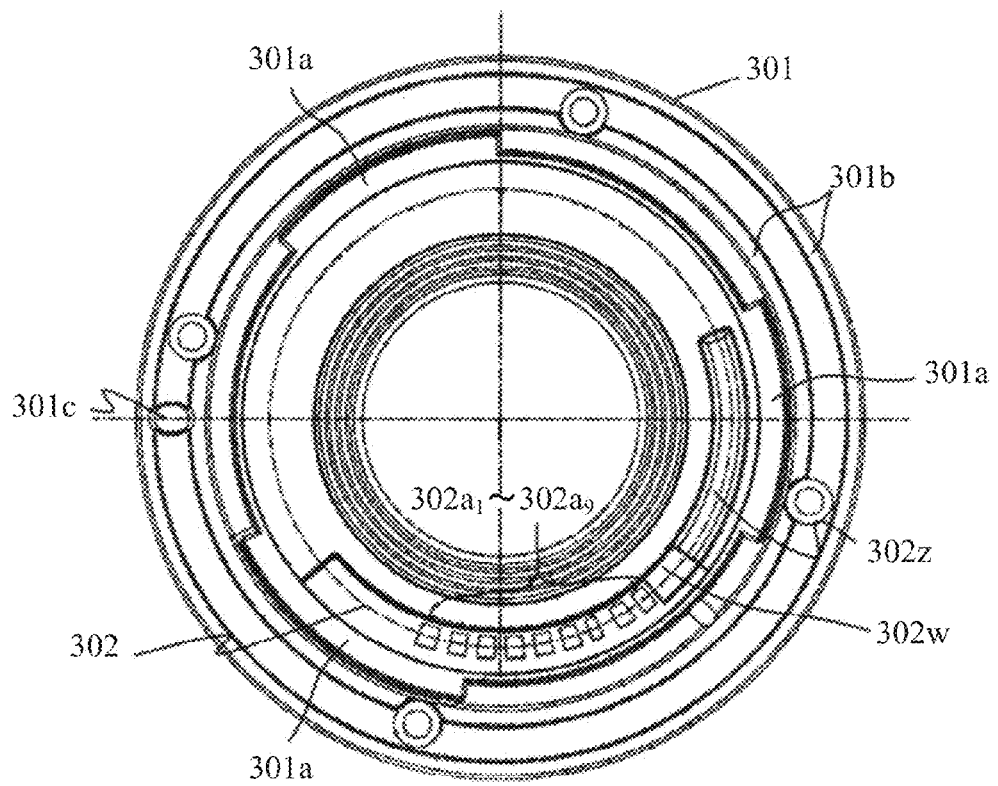
Figure 3A:
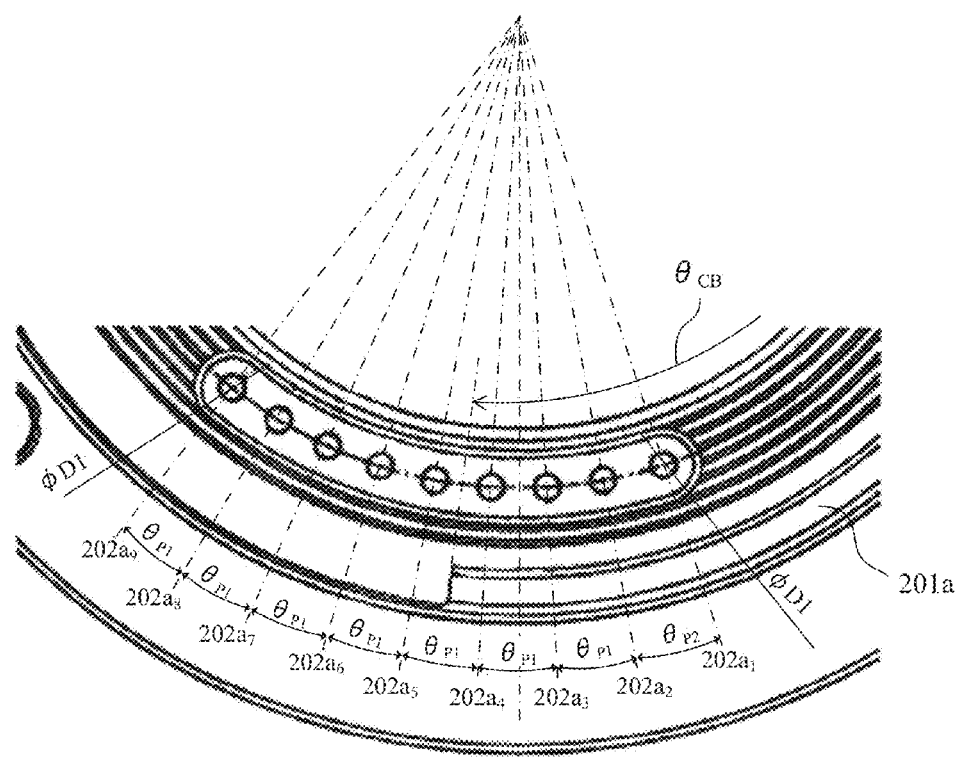
FIGS. 3A and 3B are enlarged views of the connectors.
Figure 3B:
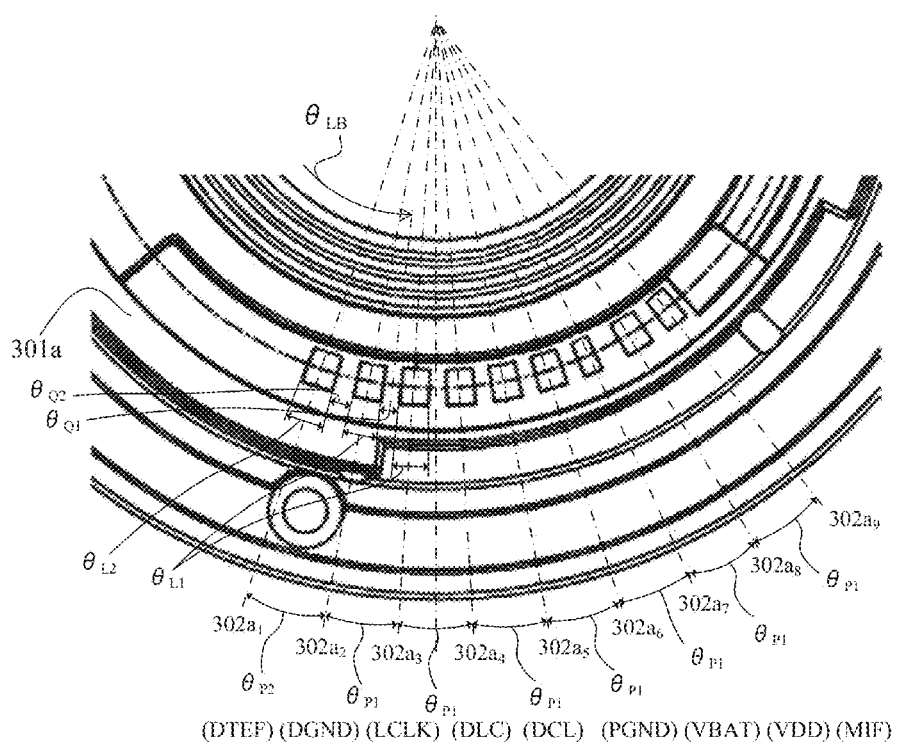
Figure 4:
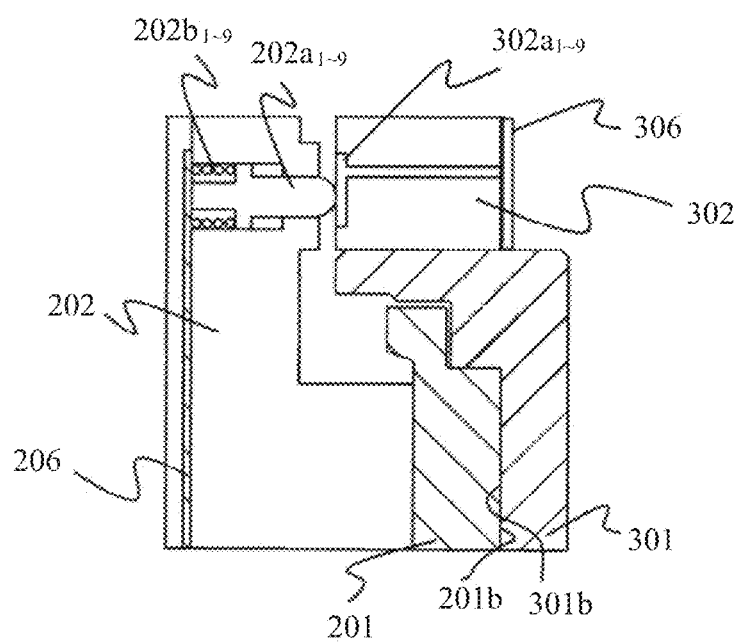
FIG. 4 is a cross-sectional view of the connectors.

FIG. 2A shows a camera side mount 201 viewed from a front side (object side) in an optical axis direction corresponding to a direction in which an optical axis of the image taking lens 101 extends. FIG. 3A is an enlarged view showing the camera side connector (constituted by a camera side contact base 202 and the camera side contact pins $202a_1$ to $202a_9$) provided in the camera side mount 201. FIG. 2B shows a lens side mount 301 viewed from a rear side (image plane side) in the optical axis direction. FIG. 3B is an enlarged view showing the lens side connector (constituted by a lens side contact base 302 and the lens side contact patterns $302a_1$ to $302a_9$) provided in the lens side mount 301. Moreover, FIG. 4 shows a cross section of the camera side connector and the lens side connector in the coupling completion state.

The camera side mount 201 is fixed at a front end portion of a camera body (not shown) as a chassis. The camera side mount 201 has, at its outer circumference side front end, a ring-shaped mount base surface 201b provided for securing a predetermined flange back, and also has, further inside than the mount base surface 201b at three places in its circumferential direction (hereinafter referred to as "a mount circumferential direction"), camera bayonet claws 201a. Moreover, the camera side mount 201 is provided with a lock pin 205 for positioning of the camera side mount 201 and the lens side mount 301 in their relative rotational direction; the lock pin 205 is movable so as to protrude and retract with respect to the mount base surface 201b.

The lens side mount (accessory side mount) 301 is fixed to a rear end portion (not shown) of the interchangeable lens. The lens side mount 301 has, at its outer circumferential side rear end portion, a mount base surface 301b that is a reference surface in the optical axis direction, and has, further inside than the mount base surface 301b at three places in its circumferential direction (mount circumferential direction), lens side (accessory side) bayonet claws 301a. Moreover, the lens side mount 301 is provided with a lock hole portion 301c into which the lock pin 205 provided in the camera side mount 201 can be inserted; the lock hole portion 301c is formed so as to open at the mount base surface 301b. The lock hole portion 301c has, in the mount circumferential direction (that is, a relative rotation direction of the camera and lens side mounts 201 and 301), an inner diameter that can engage with the lock pin 205 with almost no backlash, and has, in a radial direction (hereinafter referred to as "a mount radial direction") of the lens side mount 301, a longitudinal hole shape with an inner diameter larger than an outer diameter of the lock pin 205 to some degree. The longitudinal hole shape is provided in order to enable smooth insertion of the lock pin 205 into the lock hole portion 301c when the interchangeable lens 100 is attached to (relatively rotated with respect to) the camera 10.

In a partial area further inside than the bayonet claws 201a of the camera side mount 201, a camera side contact base (camera side contact holding portion) 202 that holds nine camera side contact pins $202a_1$, $202a_2$, ..., $202a_9$ arranged in the mount circumferential direction is formed. As shown in FIG. 4, the camera side contact pins $202a_1$ to $202a_9$ are inserted into pin holding hole portions formed in the camera side contact base 202 so as to independently protrude forward and retract rearward (that is, so as to be independently movable in protruding and retracting directions). At bottoms of the pin holding hole portions, a flexible printed wiring substrate 206 is disposed. Moreover, a contact spring ($202b_1$, $202b_2$, ..., $202b_9$) is disposed between the flexible printed wiring substrate 206 and a flange portion of each camera side contact pin ($202a_1$, $202a_2$, ..., $202a_9$); the contact spring biases the camera side contact pin to protrude it forward from the camera side contact base 202.

The camera side contact pins $202a_1$ to $202a_9$ are, in this order, connected with the DTEF terminal, the DGND terminal, the LCLK terminal, the DLC terminal, the DCL terminal, the PGND terminal, the VBAT terminal, the VDD terminal and the MIF terminal, described in FIG. 1B. The camera side contact pin $202a_2$ corresponds to a fifth camera side contact pin, the camera side contact pins $202a_4$ and $202a_5$ each correspond to an eighth camera side contact pin, the camera side contact pin $202a_6$ corresponds to a seventh camera side contact pin and the camera side contact pin $202a_8$ correspond to a fourth camera side contact pin.

The camera side contact base 202, the camera side contact pins $202a_n$ (n=1 to 9 and the same applies to the following description) and the contact springs $202b_n$ and the flexible printed wiring substrate 206 constitute the camera side connector.

In a partial area further inside than the bayonet claws 301a of the lens side mount 301, a lens side contact base (lens side contact holding portion) 302 that holds nine rectangular lens side contact patterns $302a_1$, $302a_2$, ..., $302a_9$ arranged in the mount circumferential direction is formed. The lens side contact pattern may have another shape than a rectangular shape, such as a circular shape.

The lens side contact patterns $302a_1$ to $302a_9$ are connected with the lens controller 103 shown in FIG. 1B via a flexible printed wiring substrate 306. In portions of the lens side contact base 302 adjacent to pattern holding portions that respectively hold the lens side contact patterns $302a_1$ to $302a_9$, recessed (concave) portions $302z$ that recess forward further than the pattern holding portions. Moreover, a slope $302w$ is formed between each pattern holding portion and each recessed portion $302z$ adjacent thereto. In the following description, the pattern holding portions in the lens side contact base 302 and the lens side contact patterns $302a_1$ to $302a_9$ are collectively referred to as "the lens side contact base 302".

The lens side contact patterns $302a_1$ to $302a_9$ correspond, in this order, with the camera side contact pins $202a_1$ to $202a_9$ connected with the DTEF terminal, the DGND terminal, the LCLK terminal, the DLC terminal, the DCL terminal, the PGND terminal, the VBAT terminal, the VDD terminal and the MIF terminal. The lens side contact pattern $302a_2$ corresponds to a fifth accessory side contact surface, the lens side contact patterns $302a_4$ and $302a_5$ each correspond to an eighth accessory side contact surface, the lens side contact pattern $302a_6$ corresponds to a seventh accessory side contact surface and the lens side contact pattern $302a_8$ correspond to a fourth accessory side contact surface.

The lens side contact base 302 (including the recessed portion 302z and the slope 302w), the lens side contact patterns $302a_n$ (n=1 to 9 and the same applies to the following description) and the flexible printed wiring substrate 306 constitute the lens side connector.

The camera side contact pin $202a_n$ and the lens side contact pattern $302a_n$ are arranged at positions at which they make a pair with each other (that is, positions at which they make contact with each other) in the coupling completion state of the camera 10 and the interchangeable lens 100. At a time of the lens attachment, the lens side contact base 302 (including the lens side contact pattern $302a_n$ as mentioned above) coming in contact with the camera side contact pin $202a_n$ pushes this camera side contact pin $202a_n$ into the camera side contact base 202 with charging the contact spring $202b_n$. As a result, the camera side contact pin $202a_n$ makes contact with the corresponding (paired) lens side contact pattern $302a_n$ with pressure, and thereby electrical connection between the camera 10 and the interchangeable lens 100 is established.

FIGS. 5A to 5H show a process (states) in which the lens side connector is connected with the camera side connector during the lens attachment process. In a right part of each of FIGS. 5A to 5H, a relationship between the lock pin 205 and the lock hole portion 301c in each state shown by each of FIGS. 5A to 5H.

FIG. 5A shows a state in which the lens side mount 301 is brought close to the camera side mount 201 in the optical axis direction to a position before each of the lens side bayonet claws 301a is inserted between the two camera bayonet claws 201a. This state shown in FIG. 5A is hereinafter referred to as "a mount out-of-contact state". FIG. 5B shows a state in which each of the lens side bayonet claws 301a is inserted between the two camera bayonet claws 201a and the lens side mount 301 (that is, the mount base surface 301b) is brought in contact with the camera side mount 201 (that is, the mount base surface 201b) in the optical axis direction. This state shown in FIG. 5B is hereinafter referred to as "a mount in-contact state (first state)".

FIGS. 5C to 5G show in a stepwise manner an intermediate state in which the lens side mount 301 is rotated with respect to the camera side mount 201 after the mount in-contact state toward the coupling completion state (second state). This state shown in FIGS. 5C to 5G is hereinafter referred to as "an intermediate rotation state". FIG. 5H shows a state in which the lens side mount 301 is rotated with respect to the camera side mount 201 to the coupling completion state.

In the mount in-contact state shown in FIG. 5B, the pattern holding portion (the lens side contact pattern $302a_9$ or vicinity thereof) of the lens side contact base 302 makes contact with the camera side contact pin $202a_1$. As a result, the camera side contact pin $202a_1$ is pushed into the camera side contact base 202 as compared with the mount out-of-contact state shown in FIG. 5A.

Of the multiple (n) camera side contact pins $202a_n$, the camera side contact pin $202a_1$ for the DTEF terminal which makes contact with the lens side contact base 302 in the mount in-contact state is hereinafter referred to also as "a first camera side contact pin". On the other hand, the camera side contact pins $202a_2$ to $202a_9$ other than the first camera side contact pin, that is, the camera side contact pins that do not make contact with the lens side contact base 302 in the mount in-contact state are hereinafter each referred to also as "a second camera side contact pin". Of the multiple second camera side contact pins, the camera side contact pin $202a_9$ for the MIF terminal is a third camera side contact pin.

In the state of the mount in-contact state, the lock pin 205 is pushed by the mount base surface 301b of the lens side mount 301 at a position away from the lock hole portion 301c. Therefore, subsequent rotation of the lens side mount 301 with respect to the camera side mount 201 is allowed.

After the mount in-contact state shown in FIG. 5B, via the intermediate rotation state shown in FIGS. 5C to 5G and until reaching the coupling completion state, the lens side bayonet claws 301a and the camera bayonet claws 201a completely engage with each other. During the intermediate rotation state, the lens side contact base 302 pushes also the second camera side contact pins $202a_2$ to $202a_9$ into the camera side contact base 202 while sliding with respect to these camera side contact pins $202a_1$ to $202a_9$. Thus, finally, in the coupling completion state shown in FIG. 5H, the paired camera side contact pin $202a_n$ and lens side contact pattern $302a_n$ make contact with each other with pressure.

Moreover, in the coupling completion state, since position of the lock pin 205 coincides with that of the lock hole portion 301c in the mount circumferential direction, the lock pin 205 protruding from the mount base surface 201b of the camera side mount 201 is inserted into the lock hole portion 301c of the lens side mount 301. Thereby, the coupling completion state is maintained until the lock pin 205 is pulled out from the lock hole portion 301c by a lock releasing mechanism (not shown).

Description will here be made of a process that the camera side contact pins $202a_n$ and the lens side contact patterns $302a_n$ make contact with each other during the intermediate rotation state shown in FIGS. 5D to 5G with reference to FIGS. 6A to 6D.

In the following description, a position on the lens side contact pattern $302a_n$ where the camera side contact pin $202a_n$ in the coupling completion state is referred to as "a pin contact position". A pitch of the lens side contact patterns $302a_1$ to $302a_9$ corresponds to a distance between the pin contact positions on the lens side contact patterns $302a_n$ and $302a_{n+1}$ adjacent to each other.

Moreover, a distance between the pin contact position on the lens side contact pattern $302a_n$ and a left end of the lens side contact pattern $302a_n$ in the figure (that is, an end in a direction in which the lens side contact pattern $302a_n$ is moved with respect to the camera side contact pin $202a_n$) is represented by $La_n$ ($La_1$ to $La_9$). The distances $La_1$ to $La_9$ are set to have the following relationship:

$$La_1 > La_2, La_3, La_4, La_5, La_6, La_8 > La_9 > La_7.$$

This relationship can be reworded, for example, as follows with focusing on the lens side contact patterns $302a_1$ and $302a_9$ and the camera side contact pins $202a_1$ and $202a_9$. A distance in the mount circumferential direction between a portion, of the lens side contact pattern $302a_1$, where the contact with the camera side contact pin $202a_1$ starts in the intermediate rotation state and a portion, of the lens side contact pattern $302a_9$, where the contact with the camera side contact pin $202a_9$ starts in the intermediate rotation state is represented by $L_A$. The wording "the portion where the contact starts" means, when the contact pattern has a rectangular shape, a side of the rectangular contact pattern, and when the contact pattern has a circular shape, an apex of a circular arc of the circular contact pattern. The distance in the mount circumferential direction can be also said as an angle. Furthermore, a distance (angle) in the mount circumferential direction between (central axes of) the camera side contact pins $202a_1$ and $202a_9$ is represented by $L_B$. The distance $L_A$ is shorter than the distance $L_B$ (in other words, the distance $L_B$ is longer than the distance $L_A$).

When the lens side mount 301 is rotated from the state shown in FIG. 5C, the paired camera side contact pin (DTEF terminal pin) $202a_1$ and lens side contact pattern (DTEF terminal pattern) $302a_1$ start their contact with each other as shown in FIG. 6A. At this point, since $La_1$ to $La_9$ (that is, $L_A$ and $L_B$) have the above-mentioned relationship, the other paired camera side contact pin ($202a_2$ to $202a_9$) and lens side contact pattern ($302a_2$ to $302a_9$) do not make contact with each other.

When the lens side mount 301 is further rotated from the state shown in FIG. 6A, the paired camera side contact pin ($202a_2$ to $202a_6$ and $202a_8$) and lens side contact pattern ($302a_2$ to $302a_6$ and $302a_8$) simultaneously start their contact with each other as shown in FIGS. 6B and 5E. At this point, the paired camera side contact pin ($202a_7$ and $202a_9$) and lens side contact pattern ($302a_7$ and $302a_9$) do not make contact with each other.

Figure 6C:
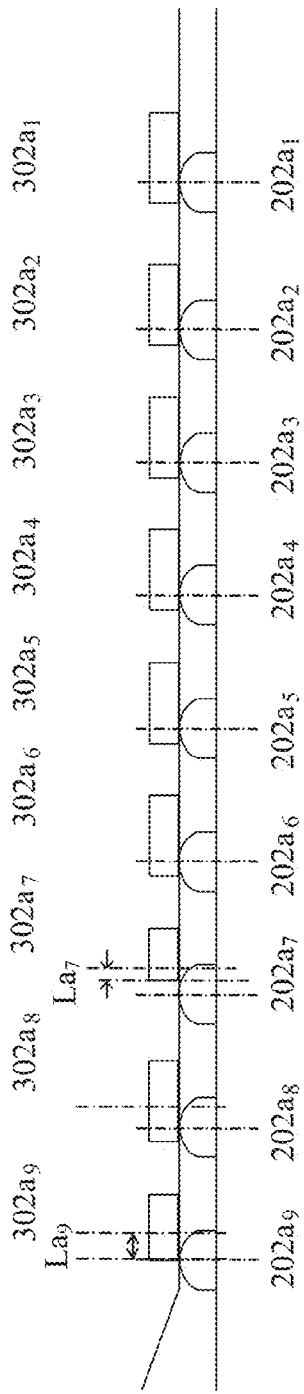

When the lens side mount 301 is further rotated from the state shown in FIG. 6B, the paired camera side contact pin (MIF terminal pin) $202a_9$ and lens side contact pattern (MIF terminal pattern) $302a_9$ start their contact with each other as shown in FIGS. 6C and 5F. At this point, since $La_9$ and $La_1$ have the following relationship:

$$La_9 > La_7,$$

the paired camera side contact pin $202a_7$ and lens side contact pattern $302a_7$ do not make contact with each other.

Figure 6D:
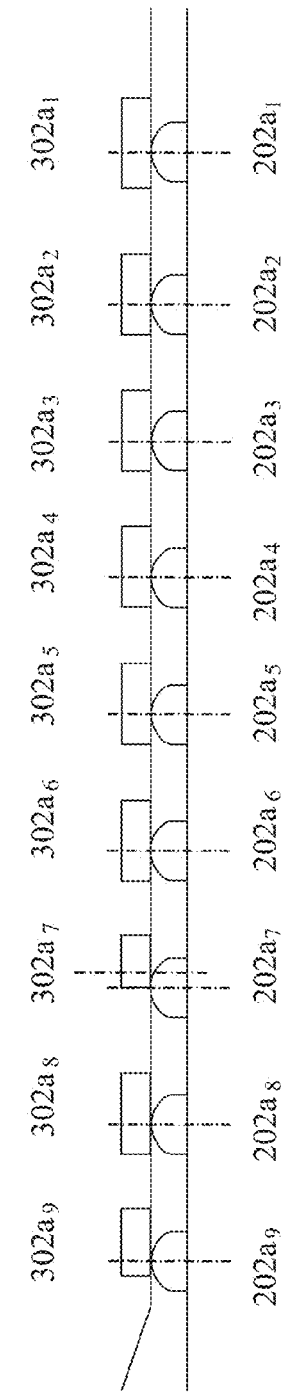

When the lens side mount 301 is further rotated from the state shown in FIG. 6C, the paired camera side contact pin (VBAT terminal pin) $202a_7$ and lens side contact pattern (VBAT terminal pattern) $302a_7$ start their contact with each other as shown in FIGS. 6D and 5G.

Figure 6E:
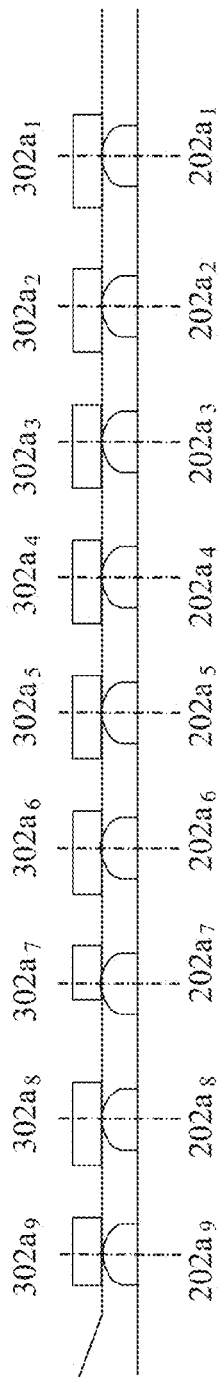

Then, when the lens side mount 301 is further rotated from the state shown in FIG. 6D, the lens and camera side mounts 301 and 201 reach the coupling completion state as shown in FIGS. 6E and 5H.

As described above, the order in which the paired camera side contact pin and lens side contact pattern make contact with each other is a descending order of the distance $La_n$, and therefore the paired camera side contact pin $202a_1$ and lens side contact pattern $302a_1$ constituting the DTEF terminal first start their contact with each other.

The distance $L_A$ and the distance $L_B$ may be equal to each other. In this case, it is desirable to increase the distance $L_A$ so as to cause it to coincide with the distance $L_B$ such that a timing at which the DTEF terminal pin and the DTEF terminal pattern make contact with each other coincides with a timing at which the DTEF terminal pin and the DTEF terminal pattern make contact with each other. With this distance stetting, a width of the lens side contact pattern $302a_1$ in the mount circumferential direction may be increased on an opposite side portion (right portion in FIGS. 6A to 6E) to the portion where the contact with the camera side contact pin starts. In the case where the distance $L_A$ and the distance $L_B$ are equal to each other, when the lens side mount 301 is rotated from the state shown in FIG. 5C, the camera side contact pins (DTEF and MIF terminal pins) $202a_1$ and $202a_9$ and the lens side contact patterns $302a_1$ and $302a_9$ corresponding thereto simultaneously start their contact.

Next, description will be made of problems relating to the first camera side contact pin $202a_1$ and a solution thereof. If the lens side mount 301 makes hard contact with the camera side mount 201 when these mounts 301 and 201 reach the mount in-contact state from the mount out-of contact state, the lens side contact base 302 strongly hits the first camera side contact pin $202a_1$. The first camera side contact pin $202a_1$ is inserted movably (that is, with an engaging gap allowing its movement) into the pin holding hole portion formed in the camera side contact base 202. Thus, impact due to the hit is likely to cause tilt or deformation (such as bending) of the first camera side contact pin $202a_1$ from a position nearly straightly extending in the optical axis direction, according to the engaging gap between the first camera side contact pin $202a_1$ and the pin holding hole portion. In this case, even though the mounts 301 and 201 reach the coupling completion state, the first camera side contact pin $202a_1$ does not make normal contact with the lens side contact pattern $302a_1$ pairing therewith, which may cause communication error between the camera and the interchangeable lens or power supply short-circuiting.

Thus, in this embodiment, a width in the mount circumferential direction and a height in the mount radial direction of the lens side contact pattern $302a_n$, a pitch and an interval of the lens side contact patterns $302a_n$, a pitch of the camera side contact pins $202a_n$ and a diameter of the camera side contact pin $202a_n$ are set as follows.

[The Width and Height of the Lens Side Contact Pattern (Accessory Side Contact Surface)]

The lens side contact patterns $302a_2$ to $302a_9$ respectively pairing with (or corresponding to) the second camera side contact pins $202a_2$ to $202a_9$ are hereinafter referred to as "second lens side contact patterns" (second accessory side contact surfaces). The second lens side contact patterns $302a_2$ to $302a_9$ are contact surfaces that do not make contact with the first camera side contact pin $202a_1$ in the coupling completion state.

Figure 7A:
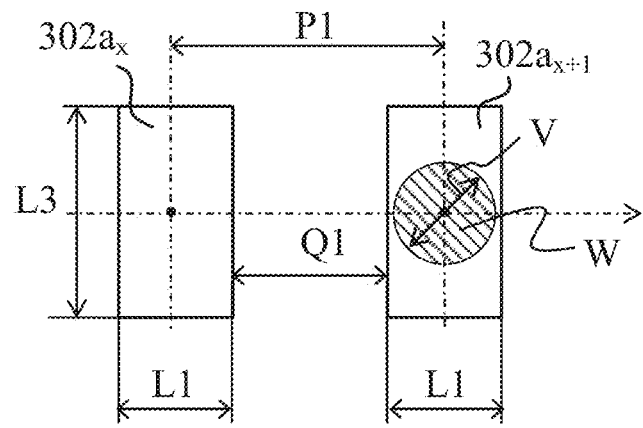
FIGS. 7A and 7B shows lens side contact patterns in Embodiment 1.
Figure 8A:
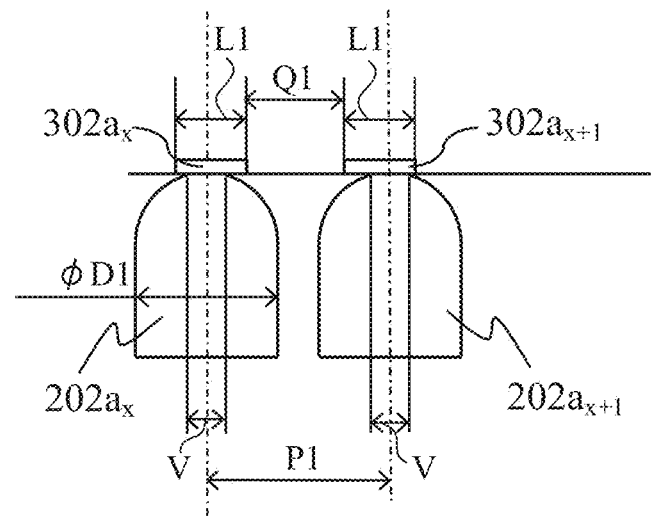
FIGS. 8A and 8B show camera side contact pins in a coupling completion state of the mounts in Embodiment 1.

The lens side contact pattern $302a_9$ for the MIF terminal corresponds to a third accessory side contact surface. The width of these second lens side contact patterns $302a_2$ to $302a_9$ is set to L1 as shown in FIGS. 7A and 8A. In FIGS. 7A and 8A, the second camera side contact pin is denoted by $202a_x$, and the second camera side contact pins adjacent to each other are denoted by $202a_x$ and $202a_{x+1}$. Moreover, the second lens side contact pattern corresponding to the second camera side contact pin $202a_x$ is denoted by $302a_x$, and the second lens side contact patterns adjacent to each other are denoted by $302a_x$ and $302a_{x+1}$.

The width L1 is set, as shown in FIG. 8A, to be larger by a predetermined margin than a diameter V of a pin contact area W of the second lens side contact pattern $302a_x$ with which the second camera side contact pin $202a_x$ nearly straightly extending in the optical axis direction without being deformed makes contact. A tip of the second camera side contact pin $202a_x$ is worn away by repeated sliding of the tip with respect to the lens side contact patterns at times of the lens attachment and detachment. Therefore, the pin contact area W where the second camera side contact pin $202a_x$ makes contact is set in consideration of this wear. The diameter V is a width (diameter) of a portion of the tip of the second camera side contact pin $202a_x$, portion which makes contact with the second lens side contact pattern $302a_x$.

Moreover, the height of the second lens side contact pattern $302a_x$ is set to L3 as shown in FIG. 7A.

Figure 7B:
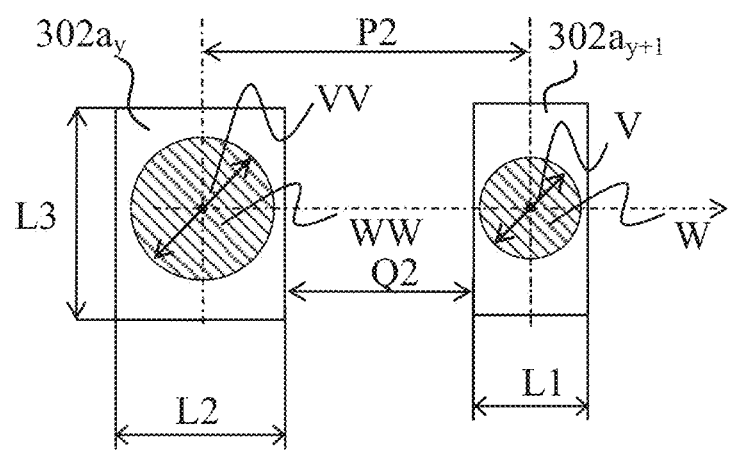
Figure 8B:
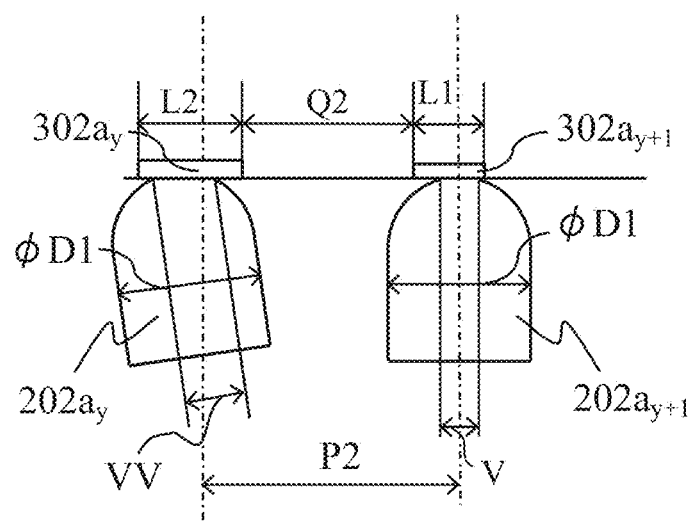

On the other hand, the lens side contact pattern $302a_1$ pairing with (or corresponding to) the first camera side contact pin $202a_1$ is hereinafter referred to as "a first lens side contact pattern" (first accessory side contact surface). The width of the first lens side contact pattern $302a_1$ is set to L2 larger than L1 as shown in FIGS. 7B and 8B. In FIGS. 7B and 8B, the first camera side contact pin is denoted by $202a_y$, and the first and second camera side contact pins adjacent to each other are denoted by $202a_y$ and $202a_{y+1}$. Moreover, the first lens side contact pattern corresponding to the first camera side contact pin $202a_y$ is denoted by $302a_y$, and the first and second lens side contact patterns adjacent to each other are denoted by $302a_y$ and $302a_{y+1}$.

FIG. 8B shows the first camera side contact pin $202a_y$ whose tip is displaced by tilt or deformation of the pin $202a_y$ from its original position nearly straightly extending in the optical axis direction. The width L2 is set, as shown in FIG. 8B, to be larger by a predetermined margin than a diameter VV of a possible pin contact area WW of the first lens side contact pattern $302a_y$. The possible pin contact area WW corresponds to a possible displacement amount (designed value) of the tip of the first camera side contact pin $202a_y$. For example, the possible pin contact area WW is an area where, if the first camera side contact pin $202a_y$ is deformed such that the tip thereof exceeds this area, a determination of failure or abnormality is made.

The tip of the first camera side contact pin $202a_y$ is also worn away by repeated sliding of the tip with respect to the lens side contact patterns at the times of the lens attachment and detachment. Therefore, the possible pin contact area WW, of the first lens side contact pattern $302a_y$, where the first camera side contact pin $202a_y$ is likely to make contact is set in consideration of this wear. The diameter VV is a width (diameter) of a portion of the tip of the first camera side contact pin $202a_y$, portion which makes contact with the first lens side contact pattern $302a_y$.

Moreover, the height of the first lens side contact pattern $302a_y$ is set to L3 that is same as the height of the second lens side contact pattern $302a_x$ as shown in FIG. 7B.

Although this embodiment describes the case where the height L3 of each lens side contact pattern is larger than the widths L1 and L2, the height L3 may be equal to the width L1 or L2, and may be smaller than the width L1 or L2.

Furthermore, although FIGS. 7A and 7B schematically show that the pin contact position is located at an approximate center of the lens side contact pattern in the mount diameter and circumferential directions, the pin contact position is not limited thereto. In this embodiment, as shown in FIG. 6E, each pin contact position is located at an off-center position of the lens side contact pattern in the mount diameter direction.

As described above, in this embodiment, the width of the first lens side contact pattern $302a_y$ corresponding to the first camera side contact pin $202a_y$ in which tilt or deformation is likely to be caused is set to be larger than that of the second lens side contact pattern $302a_x$ corresponding to the second camera side contact pin $202a_x$ in which such tilt and deformation is not caused. Thereby, if the tilt or deformation is caused in the first camera side contact pin $202a_y$ ($202a_1$) due to the contact (hit) of the lens side contact base 302 to the first camera side contact pin $202a_y$, normal contact (electrical connection) of the second camera side contact pin $202a_y$ and the first lens side contact pattern $302a_y$ ($302a_1$) is secured, and thereby can prevent the communication error between the camera 10 and the interchangeable lens 100 and the power source short-circuiting.

FIG. 3B shows the widths L1 and L2 as angular range $\theta_{L1}$ and $\theta_{L2}$ on the lens side contact base 302 formed into a circular arc shape in the lens side mount 301.

[The Pitch and Interval of the Lens Side Contact Patterns (Accessory Side Contact Surfaces) and the Pitch of the Camera Side Contact Pins]

The pitch and interval of the second lens side contact patterns $302a_x$ and $302a_{x+1}$ ($302a_2$ to $302a_9$) are respectively set to P1 and Q1 as shown in FIGS. 7A and 8A. The pitch of the lens side contact patterns in this embodiment is a distance in the mount circumferential direction between the pin contact positions on the lens side contact patterns adjacent to each other. Moreover, the interval of the lens side contact patterns is a distance in the mount circumferential direction between one lens side contact pattern and the lens side contact pattern adjacent thereto (between sides of the rectangular contact patterns). The interval of the lens side contact patterns has an important implication for the contact of the lens side contact pattern and the camera side contact pin. Moreover, the pitch of the second camera side contact pins $202a_x$ and $202a_{x+1}$ (that is, a distance between center axes of these pins) is also set to P1 so as to coincide with the pitch P1 of the second lens side contact patterns $302a_x$ and $302a_{x+1}$.

The pitch P1 and interval Q1 are decided so as to satisfy the following conditions in addition to a precondition that a pin contact area of the second lens side contact pattern $302a_x$ where the second camera side contact pin $202a_x$ makes contact is W.

Figure 9A:
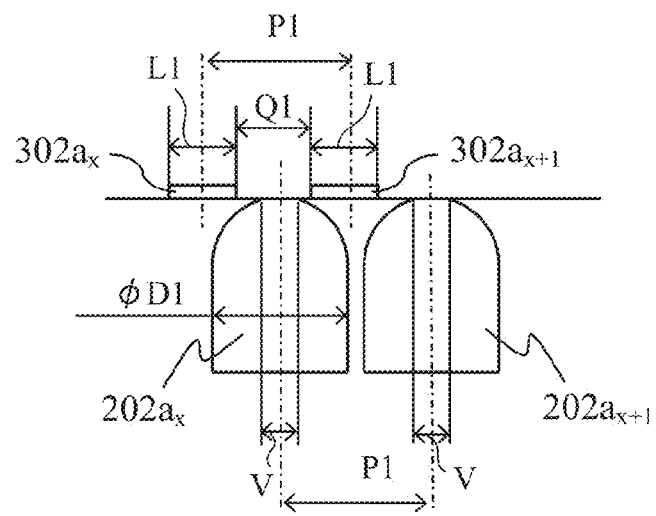
FIGS. 9A to 9 C show the camera side contact pins in an intermediate rotation state of the mounts in Embodiment 1.

As a first condition, as shown in FIG. 9A, it is necessary that one second camera side contact pin $202a_x$ does not simultaneously make contact with the second lens side contact patterns $302a_x$ and $302a_{x+1}$ adjacent to each other during the rotation of the interchangeable lens for the lens attachment and detachment. That is, it is necessary to set the interval Q1 to be larger than a width V of the pin contact area W (Q1>V).

As a second condition, it is necessary that one second lens side contact pattern $302a_{x+1}$ does not simultaneously make contact with the second camera side contact pins $202a_x$ and $202a_{x+1}$ adjacent to each other.

As a third condition, it is necessary to satisfy the above-mentioned first and second conditions even if the distance between the second lens side contact patterns $302a_x$ is narrowed due to positional error thereof.

Satisfaction of the first to third conditions makes it possible to prevent failures, such as the power source short-circuiting, caused by simultaneous conduction of the mutually adjacent second lens side contact patterns $302a_x$ and $302a_{x+1}$ or the mutually adjacent second camera side contact pins $202a_x$ and $202a_{x+1}$.

On the other hand, the pitch and interval of the first lens side contact pattern $302a_y$ ($302a_1$) and the second lens side contact pattern $302a_{y+1}$ ($302a_2$) are respectively set to P2 and Q2 that are respectively larger than P1 and Q1, as shown in FIGS. 7B and 8B. The pitch of the first and second camera side contact pins $202a_y$ and $202a_{y+1}$ (that is, a distance between center axes of these pins) is also set to P2 so as to coincide with the pitch P2 of the first and second lens side contact patterns $302a_y$ and $302a_{y+1}$.

The pitch P2 and interval Q2 are decided on a basis of a precondition that the possible pin contact area of the first lens side contact pattern $302a_y$ where the first camera side contact pin $202a_y$ makes contact is WW larger than W.

Therefore, the pitch P2 and interval Q2 are decided on a basis of another precondition that the width of the first lens side contact pattern $302a_y$ is L2 larger than L1. Furthermore, the pitch P2 and interval Q2 are decided so as to satisfy the following conditions.

Figure 9B:
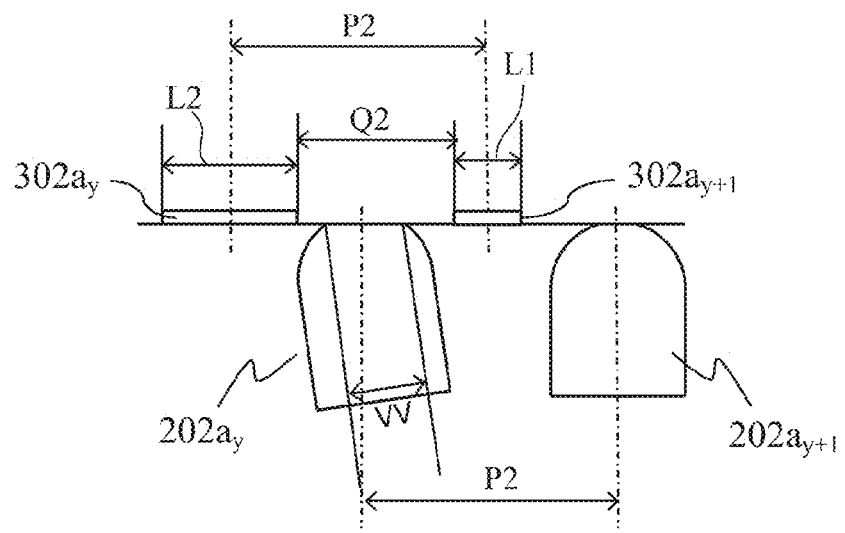

As a first condition, as shown in FIG. 9B, it is necessary that the first camera side contact pin $202a_y$ does not simultaneously make contact with the first and second lens side contact patterns $302a_y$ and $302a_{y+1}$ adjacent to each other during the rotation of the interchangeable lens for the lens attachment and detachment. That is, it is necessary to set the interval Q2 to be larger than a width VV of the possible pin contact area WW (Q2>VV). In addition, P2 is larger than VV (P2>VV).

Figure 9C:
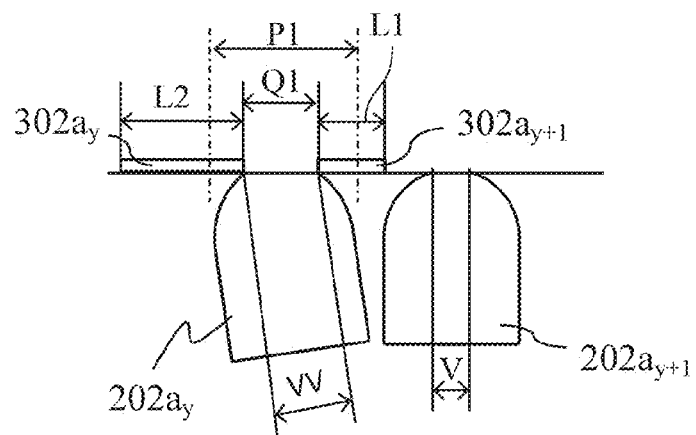

FIG. 9C shows a case where the pitch and interval of the first and second lens side contact patterns $302a_y$ and $302a_{y+1}$ adjacent to each other are set to P1 and Q1. In this case, the first camera side contact pin $202a_y$ simultaneously makes contact with the first and second lens side contact pattern $302a_y$ and $302a_{y+1}$.

As described above, the contact (hit) of the lens side contact base 302 to the camera side contact pin $202a_1$ is likely to cause the tilt or deformation of the camera side contact pin $202a_1$. If the camera side contact pin $202a_1$ simultaneously makes contact with the DTEF terminal pattern that is the first lens side contact pattern $302a_1$ and the DGND terminal pattern that is the second lens side contact pattern $302a_2$ adjacent thereto, the following failures are caused. As mentioned above, the camera microcomputer 20 determines that the type of the attached interchangeable lens 100 on the basis of the voltage value of the DTEF_IN terminal. If the camera side contact pin $202a_1$ simultaneously makes contact with the DTEF terminal pattern and the DGND terminal pattern, the DTEF terminal pattern and the DGND terminal pattern are conducted with each other, which is likely to cause the camera microcomputer 20 to make an erroneous determination of the type (lens type) of the attached interchangeable lens 100. Since the camera microcomputer 20 sets the communication voltage with the interchangeable lens 100 based on that determination result, the determination result indicating a different lens type from that of the actually attached interchangeable lens prevents setting of a proper communication voltage, which makes it impossible to perform good communication. Thus, this embodiment increases the interval between the first lens side contact pattern $302a_1$ and the second lens side pattern $302a_2$ adjacent thereto, in consideration of the tilt and deformation of the camera side contact pin $202a_1$.

As a second condition, it is necessary that one first lens side contact pattern $302a_{y+1}$ does not simultaneously make contact with the first and second camera side contact pins $202a_y$ and $202a_{y+1}$ adjacent to each other.

Furthermore, as a third condition, it is necessary to satisfy the above first and second conditions even if the distance between the first lens side contact patterns $302a_y$ is narrowed due to positional error thereof.

Satisfaction of the first to third conditions makes it possible to prevent failures, such as the power source short-circuiting, caused by simultaneous conduction of the mutually adjacent first and second lens side contact patterns $302a_y$ and $302a_{y+1}$ or the mutually adjacent first and second camera side contact pins $202a_y$ and $202a_{y+1}$.

FIGS. 3A and 3B show the pitches P1 and P2 as angle ranges $\theta_{P1}$ and $\theta_{P2}$ on the camera side and lens side contact bases 202 and 302 formed into a circular arc shape in the camera side and lens side mounts 201 and 301. Moreover, FIG. 3B shows the intervals Q1 and Q2 as angle ranges $\theta_{Q1}$ and $\theta_{Q2}$ on the circular arc-shaped lens side contact base 302 formed in the lens side mount 301.

When considering a rotation amount required for the bayonet coupling, in order to reduce the rotation amount, it is essentially desirable to reduce the pitch of the camera side contact pins as much as possible as long as the power source short-circuiting or the like can be prevented. However, it is necessary for the pitch of the first camera side contact pin $202a_1$ and the second camera side contact pin $202a_2$ adjacent thereto to consider, as mentioned above, the tilt and the deformation of the first camera side contact pin $202a_1$ due to the contact (hit) of the lens side contact base 302. Thus, this embodiment increases the pitch of the first camera side contact pin $202a_1$ and the second camera side contact pin $202a_2$ adjacent thereto as compared with that of the other second camera side contact pins $202a_2$ to $202a_9$.

Figure 10:
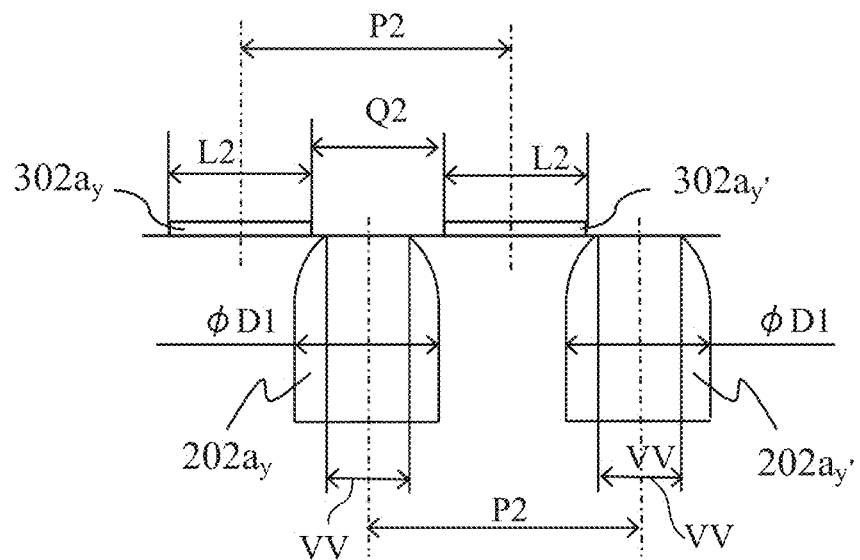
FIG. 10 shows camera side contact pins in a modified example of Embodiment 1.

Although this embodiment describes the case where one first lens side contact pattern and one camera side contact pin are provided, a plurality of the first lens side contact patterns may be provided together with a plurality of the first camera side contact pins. In this case, as shown in FIG. 10, it is desirable to respectively set the pitch and interval between the first lens side contact pattern $302a_y$ and the first lens side contact pattern $302a_y'$ adjacent thereto to P2 and Q2, and to set the pitch between the first camera side contact pin $202a_y$ and the first camera side contact pin $202a_y'$ adjacent thereto to P2. The pitch and the interval between the mutually adjacent first and second lens side contact patterns are set to P2 and Q2, and the pitch between the mutually adjacent first and second camera side contact pins is set to P2. However, it is not necessarily needed that the pitch and interval of the mutually adjacent first and second lens side contact patterns are same as those of the mutually adjacent first lens side contact patterns. In other words, when the former pitch and interval are represented by P2a and Q2a and the latter pitch and interval are represented by P2b and Q2b, they may have the following relationships:

P2a≠P2b (where P1<P2a).

Q2a≠Q2b (where Q1<Q2a).

In this case, the pitch between the mutually adjacent first lens side contact patterns and the pitch between the mutually adjacent first and second camera side contact pins are respectively set to P2a and P2b.

As described above, this embodiment uses the first and second lens side contact patterns and the first and second camera side contact pins which satisfy the following conditions (1) to (3). In the following conditions, as mentioned above, P2 includes P2a and P2b, and Q2 includes Q2a and Q2b.

$$L1<L2(\theta_{L1}<\theta_{L2}) \quad (1)$$

$$P1<P2(\theta_{P1}<\theta_{P2}) \quad (2)$$

$$Q1<Q2(\theta_{Q1}<\theta_{Q2}) \quad (3)$$

The satisfaction of the conditions (1) to (3) enables securement of normal contact (electrical connection) of the first camera side contact pin and the first lens side contact pattern to make contact therewith even if the tilt or deformation is caused in the first camera side contact pin due to the hard contact (hit) of the lens side contact base to the first camera side contact pin. Consequently, the communication error between the camera 10 and the interchangeable lens 100 and the failure of the camera 10 or the interchangeable lens 100 due to the power source short-circuiting can be prevented.

In addition, as a condition for operation (or control) at the time of the attachment of the interchangeable lens to the camera, it is desirable to satisfy a fourth condition that the above-mentioned distance $L_A$ is shorter than or equal to the distance $L_B$. In other words, it is desirable that at least one of the width L2, the pitch P2 and the interval Q2 is set such that the connection of the DTEF terminal is established earlier than or simultaneously with that of the MIF terminal.

[The Diameter of the Camera Side Contact Pin]

Figure 12A:
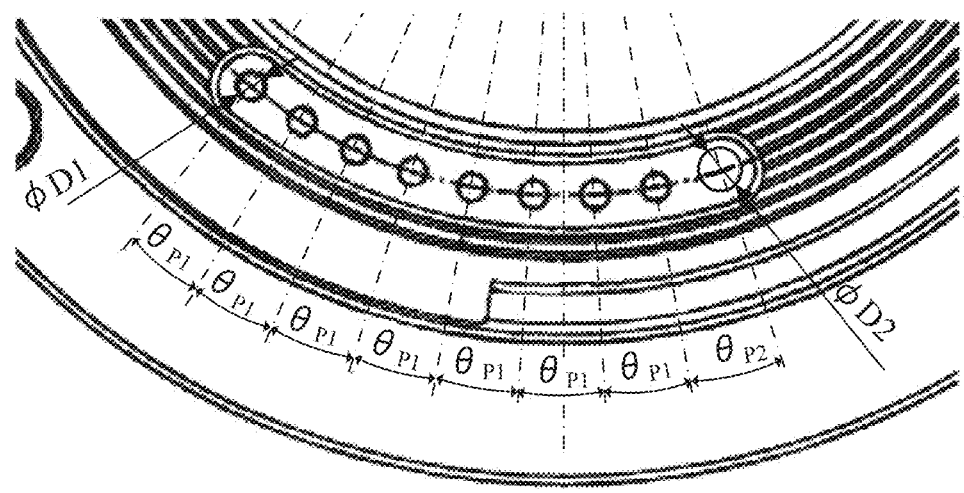
FIGS. 12A and 12B show camera side contact pins in another modified example of Embodiment 1.
Figure 12B:
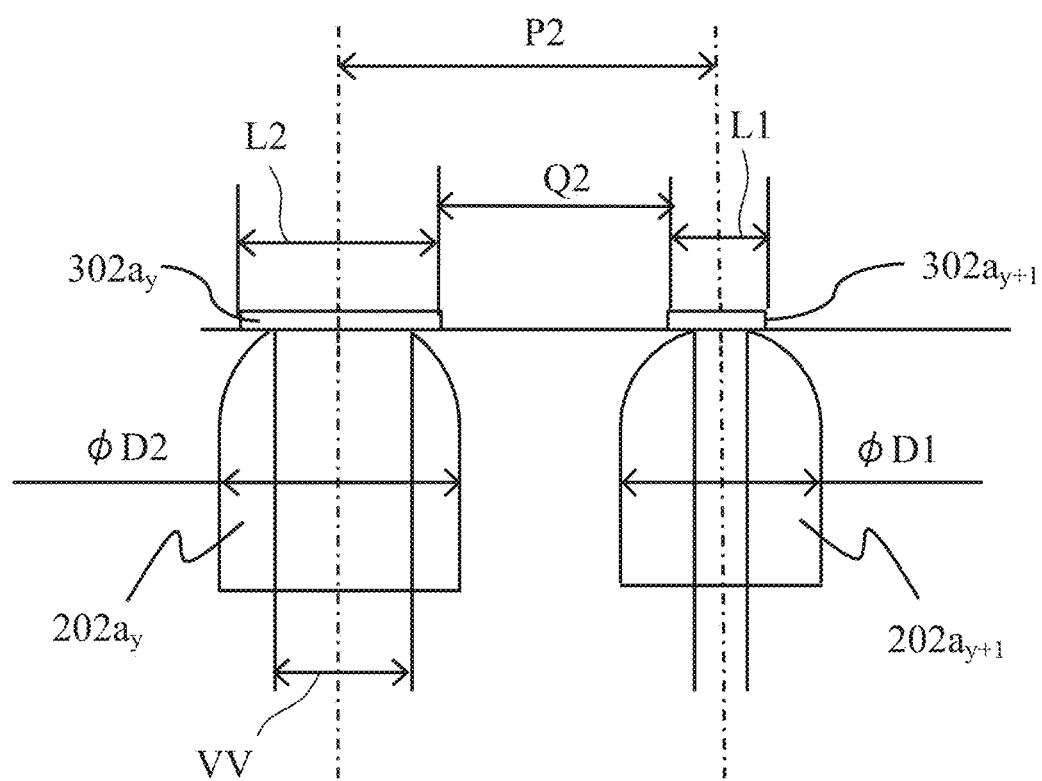

As described above, the first camera side contact pin $202a_y$ ($202a_1$) is likely to be deformed, such as being bent, by receiving the hard hit of the lens side contact base 302 in the mount in-contact state. Such deformation can be suppressed by setting a diameter $\phi D2$ of the first camera side contact pin $202a_y$ ($202a_1$) to be larger than a diameter $\phi D1$ of the second camera side contact pin $202a_{y+1}$ ($202a_2$ to $202a_9$) as shown in FIGS. 12A and 12B to increase rigidity of the first camera side contact pin $202a_y$ ($202a_1$).

In other words, the diameter $\phi D2$ of the first camera side contact pin $202a_y$ ($202a_1$) and the diameter $\phi D1$ of the second camera side camera side contact pin may be set so as to satisfy the following condition (4):

$$\phi D1 < \phi D2 \qquad (4)$$

The satisfaction of the condition (4) can makes the communication error and the power source short-circuiting due to the deformation of the first camera side contact pin $202a_y$ more unlikely to be caused.

It is not necessarily needed to satisfy all the above-described conditions (1) to (4); it is only necessary to satisfy at least one of the conditions (1), (2) and (4). The satisfaction of at least one of the conditions (1), (2) and (4) enables securement of the normal contact of the first camera side contact pin tilted or deformed and the first lens side contact pattern. Moreover, the satisfaction of the condition (3) enables solution of the problem of the power supply short-circuiting described above.

Furthermore, the satisfaction of the above-mentioned condition that the distance $L_A$ is shorter than the distance $L_B$ (or the distance $L_B$ is longer than the distance $L_A$) or the distance $L_A$ is equal to the distance $L_B$ enables setting of the proper communication voltage for the type of the interchangeable lens attached to the camera before the communication between the camera and the interchangeable lens is started. Such preset of the proper communication voltage enables prevention of the communication error due to an improper communication voltage.

Next, description will be made of a relationship among the camera bayonet claw 201a, the lens side bayonet claw 301a, the camera side contact pins and the lens side contact patterns with reference to FIGS. 2A, 2B, 3A, 3B and 16.

Figure 16:
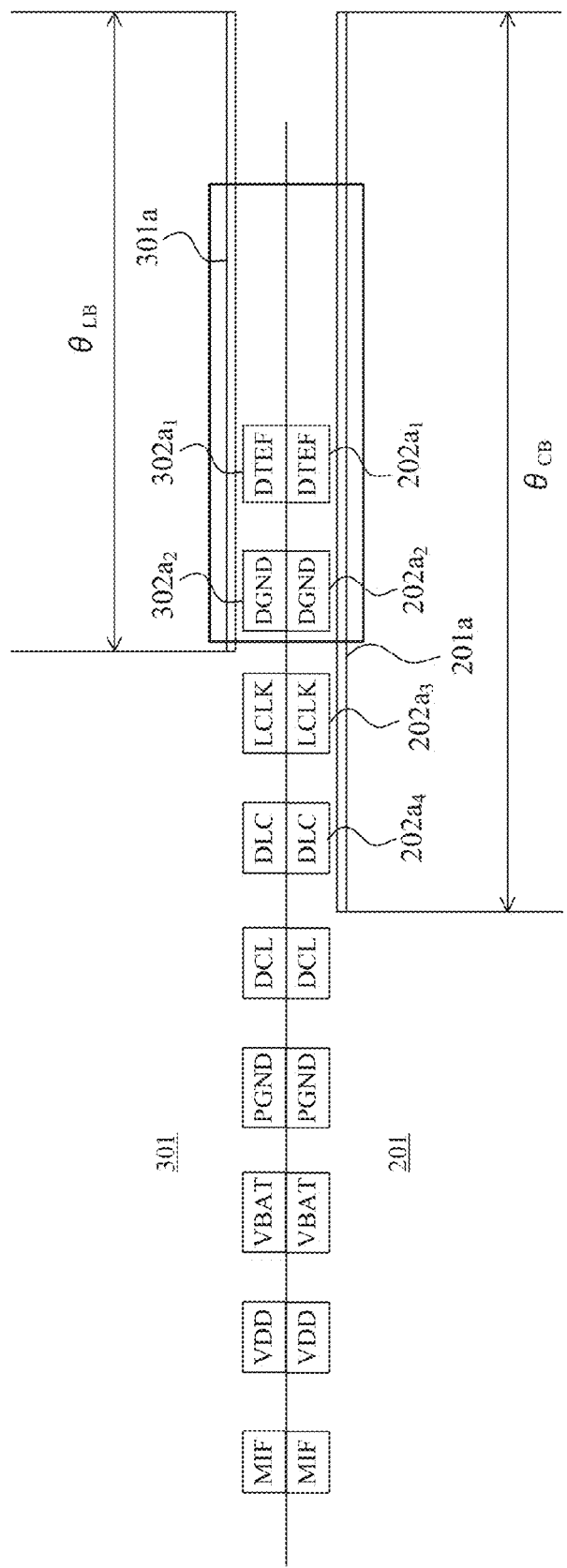
FIG. 16 shows arrangement of bayonet claws and contact patterns and pins in Embodiment 1.

FIGS. 3A, 3B and 16 show angle ranges in the mount circumferential direction (relative rotation direction) where the camera bayonet claw 201a and the lens side bayonet claw 301a are provided in the camera side mount 201 and the lens side mount 301 as $\theta_{CB}$ and $\theta_{LB}$, respectively.

In the camera side mount 201, the camera side contact pins $202a_1$ to $202a_4$ including the first camera side contact pin $202a_1$ for the DTEF terminal are arranged within the angle range $\theta_{CB}$. In other words, in the camera side mount 201, the camera side contact pins $202a_1$ to $202a_4$ are arranged at a position that overlaps the camera bayonet claw 201a in the mount radial direction. Moreover, in the lens side mount 301, the lens side contact patterns $302a_1$ and $302a_2$ including the first lens side contact pattern $302a_1$ for the DTEF terminal are arranged within the angle range $\theta_{LB}$. In other words, in the lens side mount 301, the lens side contact patterns $302a_1$ and $302a_2$ are arranged at a position that overlaps the lens side bayonet claw 301a in the mount radial direction. As described above, at least the first camera side contact pin $202a_1$ and the first lens side contact surface $302a_1$ are provided adjacent to (alongside of or side by side with) the camera side and lens side bayonet claws 201a and 301a such that contact of the first camera side contact pin $202a_1$ and the first lens side contact surface $302a_1$ is sufficiently maintainable.

Such an arrangement relationship provides, in the coupling completion state, rigid coupling of portions of the camera side and lens side mounts 201 and 301 around the camera side contact pins $202a_1$ and $202a_2$ and the lens side contact patterns $302a_1$ and $302a_2$ by engagement of the camera side and lens side bayonet claws 201a and 301a. Therefore, even if external force acts on the interchangeable lens 100 in a direction in which the interchangeable lens 100 is bent with respect to the camera 10, at least the contact between the first camera side contact pin $202a_1$ and the first lens side contact pattern $302a_1$ is maintained, which prevents contact failure therebetween.

The DTEF terminal constituted by the first camera side contact pin $202a_1$ and the first lens side contact pattern $302a_1$ is a more important terminal relating to the setting of the communication voltage between the camera 10 and the interchangeable lens 100 depending on the type of the interchangeable lens 100, as compared with other terminals for communication. Therefore, as described above, the DTEF terminal (that is, the first camera side contact pin $202a_1$ and the first lens side contact pattern $302a_1$) is provided such that its contact is earlier started than the contact of the other terminals during the lens attachment process.

Even if contact failure is temporarily caused in the other terminals for communication can be recovered by reperforming communication. However, since the DTEF terminal is used to decide the communication voltage itself (in addition, a driving voltage of the interchangeable lens), unstable contact of this DTEF terminal causes, for example, erroneous communication and erroneous operation of the interchangeable lens due to the erroneous communication, which deteriorates reliability of the camera system.

On the other hand, this embodiment ensures contact reliability of the DTEF terminal ($202a_1$ and $302a_1$) even if the external force acts on the interchangeable lens. Therefore, the camera 10 can make a correct determination of the type of the interchangeable lens 100, and thereby can set a proper communication voltage for the interchangeable lens 100.

As described above, this embodiment provides the first lens side contact pattern and the first camera side contact pin constituting the lens type determining terminal (DTEF terminal) within the angle range where the bayonet claw is provided in each mount. Consequently, this embodiment prevents the contact failure between the first lens side contact pattern and the first camera side contact pin, which enable the camera to perform correct lens type determination.

Although the above embodiment described the case where the camera determines the type of the interchangeable lens attached to the camera on the basis of the voltage of the DTEF terminal, the lens type determination may be made on the basis of, not a voltage, but a communicated signal such as a digital signal.

[Embodiment 2]

Figure 11A:
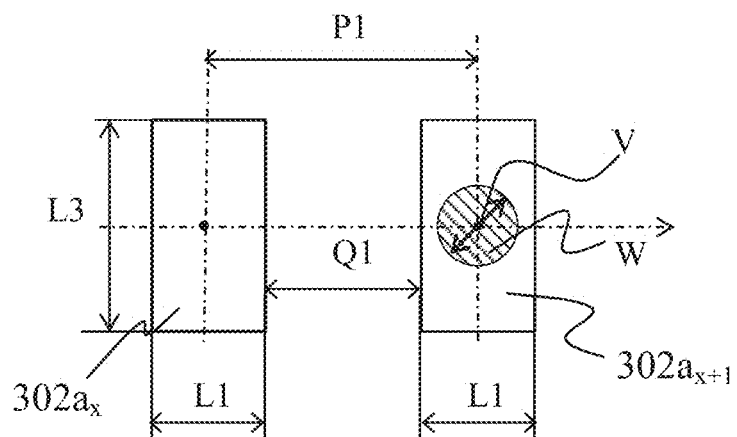
FIGS. 11A to 11C show lens side contact patterns and camera side contact pins in Embodiment 2 of the present invention.
Figure 11B:
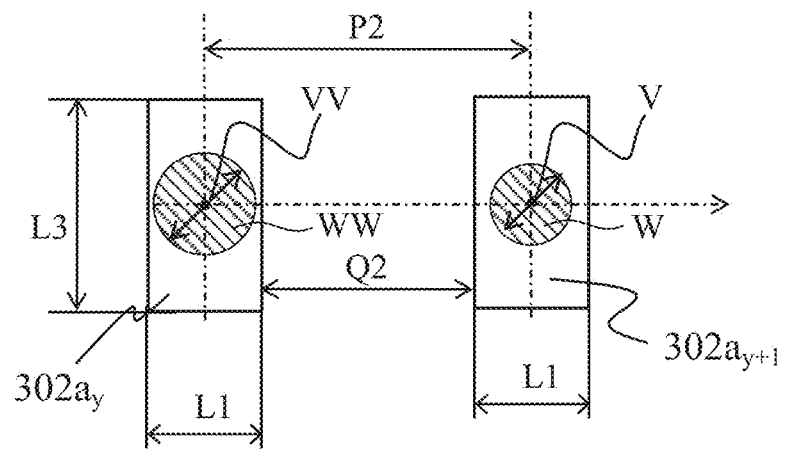
Figure 11C:
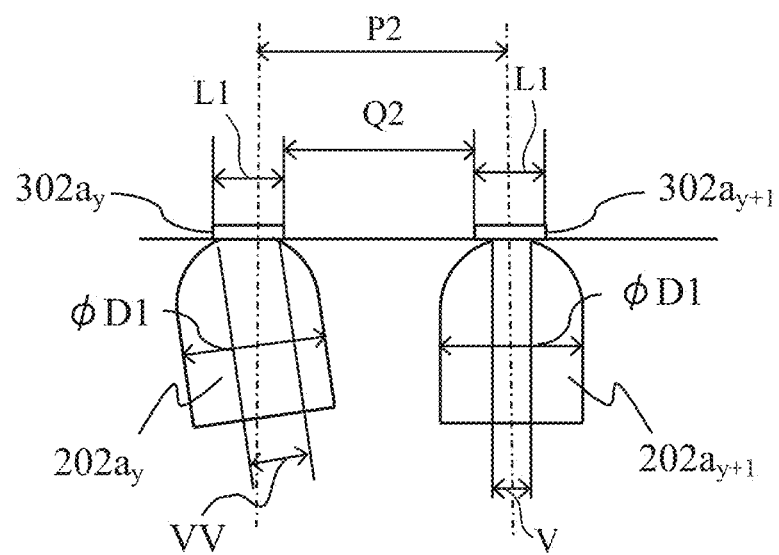

FIGS. 11A to 11C show, as a second embodiment of the present invention, a case of satisfying the above-described conditions (2) and (3), but not satisfying the conditions (1) and (4). In this embodiment, the pitch P2 and the interval Q2 between the mutually adjacent first and second lens side contact patterns $302a_y$ and $302a_{y+1}$ are larger than the pitch P1 and the interval Q1 between the mutually adjacent second lens side contact patterns $302a_x$ and $302a_{x+1}$. Moreover, the pitch P2 between the mutually adjacent first and second camera side contact pins $202a_y$ and $202a_{y+1}$ is also larger than the pitch P1 between the mutually adjacent second camera side contact pins $202a_x$ and $202a_{x+1}$.

However, the width of the first lens side contact pattern $302a_y$ is equal to L1 that is the width of the second lens side contact pattern $302a_x$ ($302a_{y+1}$). However, L1 in this embodiment is set to be larger than L1 shown in Embodiment 1, and is set to be larger than the possible pin contact area WW, of the first lens side contact pattern $302a_y$, where the first camera side contact pin $202a_y$ may make contact.

In addition, the diameters of the first and second camera side contact pins $202a_y$ and $202a_{y+1}$ ($202a_x$ and $202a_{x+1}$) are all equal to $\phi D1$.

Also in this case, normal contact of the tilted or deformed first camera side contact pin and the first lens side contact pattern can be secured, which can prevent the communication error between the camera and the interchangeable lens and the power source short-circuiting.

Moreover, as a further another embodiment, in a case of satisfying the condition (2), but not satisfying the conditions (1), (3) and (4), normal contact of the tilted or deformed first camera side contact pin and the first lens side contact pattern can be secured, which can prevent the communication error between the camera and the interchangeable lens.

Although each of the above embodiments described the case of setting the heights of the first and second lens side contact patterns to L3, the heights thereof may be different from each other.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application Nos. 2012-150961, filed on Jul. 5, 2012 and 2012-085190, 2012-085223 and 2012-085426 filed on Apr. 4, 2012, which are hereby incorporated by reference herein in their entirety.

What is claimed is:

1. A camera accessory detachably attachable to a camera, the camera accessory comprising:
an accessory mount to be detachably coupled with a camera mount provided in the camera, the accessory mount being provided with accessory bayonet claws and being brought, by relative rotation with the camera mount, from a first state in which each of the accessory bayonet claws is inserted between camera bayonet claws provided in the camera mount into a second state in which the accessory bayonet claws engage with the camera bayonet claws to complete coupling of the accessory and camera mounts;
an accessory contact holding portion provided in the accessory mount; and
a plurality of electrical contact surfaces including at least seven electrical contact surfaces arranged along a rotation direction of the accessory and camera mounts and held by the accessory contact holding portion,
wherein the plurality of electrical contact surfaces include a first electrical contact surface configured to indicate a predetermined voltage corresponding to a type of the camera accessory in the second state, thereby indicating the type of the camera accessory, a sixth electrical contact surface provided for receiving a supply of source power from the camera, and a seventh electrical contact surface provided for a ground connection corresponding to the sixth electrical contact surface,
wherein the seventh electrical contact surface is arranged between the first electrical contact surface and the sixth electrical contact surface,
wherein one of the accessory bayonet claws is positioned at a phase of the first electrical contact surface in the rotation direction of the accessory and camera mounts, and
wherein any of the accessory bayonet claws are not positioned at a phase of the sixth electrical contact surface in the rotation direction of the accessory and camera mounts.

2. A camera accessory according to claim 1, wherein the accessory bayonet claw is provided adjacent to the first electrical contact surface such that contact of the first electrical contact surface with a corresponding camera contact pin provided in the camera mount is sufficiently maintainable.

3. A camera accessory according to claim 1, wherein the first electrical contact surface is provided alongside of the accessory bayonet claw.

4. A camera accessory according to claim 1, wherein the first electrical contact surface is provided side by side with the accessory bayonet claw.

5. A camera accessory according to claim 1, wherein a plurality of camera contact pins including a first camera contact pin that makes an electrical contact with the first electrical contact surface in the second state are provided in the camera mount,
wherein the first camera contact pin contacts the electrical contact holding portion in the first state,
wherein the plurality of electrical contact surfaces include second electrical contact surfaces that do not contact the first camera contact pin in the second state, and
wherein at least one of the following conditions is satisfied along the rotation direction:
(a) a pitch between the first electrical contact surface and a second electrical contact surface adjacent thereto is larger than a pitch between the second electrical contact surfaces adjacent to each other;
(b) an interval between the first electrical contact surface and the second electrical contact surface adjacent thereto is larger than an interval between the second electrical contact surfaces adjacent to each other; and
(c) a width of the first electrical contact surface is larger than a width of the second electrical contact surface.

6. A camera accessory according to claim 5, wherein the plurality of electrical contact surfaces include a third electrical contact surface used for detection of attachment of the camera accessory to the camera, and
wherein the first electrical contact surface is provided such that, during the relative rotation of the accessory mount with the camera mount from the first state to the second state, contact of the first electrical contact surface with the first camera contact pin is started earlier than or simultaneously with start of contact of the third electrical contact surface with a third camera contact pin corresponding to the third electrical contact surface.

23

7. A camera accessory according to claim 6, wherein, along the rotation direction, a distance between (a) a portion, of the first electrical contact surface, where the contact with the first camera contact pin is started during the relative rotation from the first state to the second state and (b) a portion, of the third electrical contact surface, where the contact with the third camera contact pin is started during the relative rotation from the first state to the second state is shorter than or equal to a distance between the first camera contact pin and the third camera contact pin.

8. A camera accessory according to claim 1, wherein the plurality of electrical contact surfaces include a fourth electrical contact surface, as the power electrical contact surface, provided for receiving, from the camera, a supply of source power for communication between the camera and the camera accessory.

9. A camera accessory according to claim 8, wherein the plurality of electrical contact surfaces include a fifth electrical contact surface, as the ground electrical contact surface, provided, along with the fourth electrical contact surface, for a ground connection, and
wherein the fifth electrical contact surface is arranged between the first electrical contact surface and the fourth electrical contact surface.

10. A camera accessory according to claim 1, wherein the sixth electrical contact surface is provided for receiving, from the camera, a supply of source power for driving an actuator provided in the camera accessory.

11. A camera accessory according to claim 1, wherein the plurality of electrical contact surfaces include an eighth electrical contact surface provided for communicating data with the camera.

12. A camera accessory according to claim 11, wherein the sixth electrical contact surface is provided for receiving, from the camera, a supply of source power for driving an actuator provided in the camera accessory, and
wherein the eighth electrical contact surface is arranged between the first electrical contact surface and the sixth electrical contact surface.

13. A camera accessory according to claim 12, wherein the seventh electrical contact surface is provided, along with the sixth electrical contact surface, for a ground connection, and
wherein the seventh electrical contact surface is arranged between the sixth electrical contact surface and the eighth electrical contact surface.

14. A camera accessory according to claim 1, wherein the first electrical contact surface is connected with a resistance having a predetermined resistance value corresponding to the type of the camera accessory.

15. A camera accessory according to claim 1, wherein the first electrical contact surface is arranged within an angle range where the accessory bayonet claw is provided in a circumferential direction of the accessory mount.

16. A camera accessory according to claim 15, wherein the sixth electrical contact surface is provided for receiving, from the camera, a supply of source power for driving an actuator provided in the camera accessory.

17. A camera to which a camera accessory is detachably attachable, the camera comprising:
a camera mount to be detachably coupled with an accessory mount provided in the camera accessory, the camera mount being provided with camera bayonet claws and being brought, by relative rotation with the accessory mount, from a first state in which each of accessory bayonet claws provided in the accessory mount is inserted between the camera bayonet claws into a second state in which the camera bayonet claws engage with the accessory bayonet claws to complete coupling of the camera and accessory mounts;
a camera contact holding portion provided in the camera mount;
a plurality of camera contact pins including at least seven camera contact pins arranged along a rotation direction of the camera and accessory mounts and held by the camera contact holding portion; and
a determination unit configured to determine a type of the camera accessory attached to the camera depending on a predetermined voltage of a signal output by the camera accessory,
wherein the camera contact holding portion holds the plurality of camera contact pins movably in a direction of protruding and retracting with respect to the camera contact holding portion,
wherein the plurality of camera contact pins include a first camera contact pin used for determination of the type of the camera accessory attached to the camera, a sixth camera contact pin provided for supplying source power to the camera accessory, and a seventh camera contact pin provided for a ground connection corresponding to the sixth camera contact pin provided for supplying the source power,
wherein the seventh camera contact pin is arranged between the first camera contact pin and the sixth camera contact pin,
wherein one of the camera bayonet claws is positioned at a phase of the first camera contact pin in the rotation direction of the camera and accessory mounts, and
wherein any of the camera bayonet claws are not positioned at a phase of the sixth camera contact pin in the rotation direction of the camera and accessory mounts.

18. A camera according to claim 17, wherein the accessory mount is provided with an electrical contact holding portion and a plurality of electrical contact surfaces, including a first electrical contact surface that makes an electrical contact with the first camera contact pin in the second state, are held by the electrical contact holding portion,
wherein the first camera contact pin contacts the electrical contact holding portion in the first state,
wherein the plurality of camera contact pins include second camera contact pins that do not contact the electrical contact holding portion in the first state, and
wherein at least one of following conditions is satisfied along the rotation direction:
(a) a pitch between the first camera contact pin and a second camera contact pin adjacent thereto is larger than a pitch between the second camera contact pins adjacent to each other; and
(b) when a plurality of first camera contact pins are provided, a pitch between the plurality of first camera contact pins adjacent to each other is larger than the pitch between the second camera contact pins adjacent to each other.

19. A camera according to claim 18, wherein the plurality of camera contact pins include a third camera contact pin used for detection of attachment of the camera accessory to the camera, and
wherein the first camera contact pin is provided such that, during the relative rotation of the camera mount with the accessory mount from the first state to the second state, contact of the first camera contact pin with the first electrical contact surface is started earlier than or simultaneously with a start of contact of the third camera contact pin with a third electrical contact surface corresponding to the third camera contact pin.

20. A camera according to claim 19, wherein, along the rotation direction, a distance between the first camera contact pin and the third camera contact pin is longer than or equal to a distance between (a) a portion, of the first electrical contact surface, where the contact with the first camera contact pin is started during the relative rotation from the first state to the second state and (b) a portion, of the third electrical contact surface, where the contact with the third camera contact pin is started during the relative rotation from the first state to the second state.

21. A camera according to claim 17, wherein the plurality of camera contact pins include a fourth camera contact pin, as the power camera contact pin, provided for supplying, to the camera accessory, source power for communication between the camera and the camera accessory.

22. A camera according to claim 21, wherein the plurality of camera contact pins include a fifth camera contact pin, as the ground camera contact pin, provided, along with the fourth camera contact pin, for a ground connection, and
wherein the fifth camera contact pin is arranged between the first camera contact pin and the fourth camera contact pin.

23. A camera according to claim 17, wherein the plurality of camera contact pins include a sixth camera contact pin, as the power camera contact pin, provided for supplying, to the camera accessory, source power for driving an actuator provided in the camera accessory.

24. A camera according to claim 23, wherein the plurality of camera contact pins include a seventh camera contact pin, as the ground camera contact pin, provided, along with the sixth camera contact pin, for a ground connection, and
wherein the seventh camera contact pin is arranged between the first camera contact pin and the sixth camera contact pin.

25. A camera according to claim 17, wherein the plurality of camera contact pins include an eighth camera contact pin provided for communicating data with the camera accessory.

26. A camera according to claim 25, wherein the sixth camera contact pin is provided for supplying, to the camera accessory, source power for driving an actuator provided in the camera accessory, and
wherein the eighth camera contact pin is arranged between the first camera contact pin and the sixth camera contact pin.

27. A camera according to claim 26, wherein the seventh camera contact pin is provided, along with the sixth camera contact pin, for a ground connection, and
wherein the seventh camera contact pin is arranged between the sixth camera contact pin and the eighth camera contact pin.

28. A camera according to claim 17, wherein a voltage of a signal for communication with the camera accessory is determined depending on the type of the camera accessory determined by the determination unit.

29. A camera according to claim 17, wherein the first camera contact pin is arranged within an angle range where the camera bayonet claw is provided in a circumferential direction of the camera mount.

30. A camera according to claim 29, wherein the sixth camera contact pin is provided for supplying, to the camera accessory, source power for driving an actuator provided in the camera accessory, and
wherein the sixth camera contact pin is arranged out of the angle range where the camera bayonet claw is provided in the circumferential direction of the camera mount.

31. A camera accessory comprising:
an accessory mount to be detachably coupled with a camera, the accessory mount including accessory bayonet claws; and
a plurality of electrical contact surfaces including at least seven electrical contact surfaces provided in the accessory mount in a circumferential direction,
wherein the plurality of electrical contact surfaces include a first electrical contact surface configured to indicate a predetermined voltage corresponding to a type of the camera accessory in a case where the camera accessory is coupled with the camera, thereby indicating the type of the camera accessory, a sixth electrical contact surface provided for receiving a supply of source power from the camera, and a seventh electrical contact surface provided for a ground connection, corresponding to the sixth electrical contact surface,
wherein the seventh electrical contact surface is arranged between the first electrical contact surface and the sixth electrical contact surface,
wherein one of the accessory bayonet claws is positioned at a phase at which the first electrical contact surface is arranged in the circumferential direction, and
wherein any of the accessory bayonet claws are not positioned at a phased at which the sixth electrical contact surface is arranged in the circumferential direction.

32. A camera accessory according to claim 31, wherein the accessory bayonet claw is provided adjacent to the first electrical contact surface such that contact of the first electrical contact surface with a corresponding camera contact pin provided in the camera is sufficiently maintainable.

33. A camera accessory according to claim 31, wherein the first electrical contact surface is provided alongside of the accessory bayonet claw.

34. A camera accessory according to claim 31, wherein the first electrical contact surface is provided side by side with the accessory bayonet claw.

35. A camera accessory according to claim 31, wherein the first electrical contact surface is connected with a resistance having a predetermined resistance value corresponding to the type of the camera accessory.

36. A camera accessory according to claim 31, wherein the first electrical contact surface is arranged within an angle range where the accessory bayonet claw is provided in a circumferential direction of the accessory mount.

37. A camera accessory according to claim 36, wherein the sixth electrical contact surface is provided for receiving, from the camera, a supply of source power for driving an actuator provided in the camera accessory, and
wherein the sixth electrical contact surface is arranged out of the angle range where the accessory bayonet claw is provided in the circumferential direction of the accessory mount.

38. A camera accessory according to claim 31, wherein the sixth electrical contact surface is provided for receiving, from the camera, a supply of source power for driving an actuator provided in the camera accessory, and an eighth electrical contact surface provided for communicating data with the camera, and
wherein the eighth electrical contact surface is arranged between the first accessory contact surface and the sixth accessory as the ground contact surface.

39. A camera accessory according to claim 38, wherein the seventh electrical contact surface is provided, along with the sixth electrical contact surface, for a ground connection, and wherein the seventh electrical contact surface is arranged between the sixth electrical contact surface and the eighth electrical contact surface.

* * * * *